US011996777B2

(12) United States Patent
Cacciotto

(10) Patent No.: US 11,996,777 B2
(45) Date of Patent: May 28, 2024

(54) CONTROL CIRCUIT FOR AN ELECTRONIC CONVERTER, RELATED INTEGRATED CIRCUIT, ELECTRONIC CONVERTER AND METHOD

(71) Applicant: STMICROELECTRONICS S.R.L., Agrate Brianza (IT)

(72) Inventor: Fabio Cacciotto, Camporotondo Etneo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 114 days.

(21) Appl. No.: 17/590,751

(22) Filed: Feb. 1, 2022

(65) Prior Publication Data

US 2023/0246552 A1     Aug. 3, 2023

(51) Int. Cl.
*H02M 3/335*     (2006.01)
*H02M 1/08*     (2006.01)

(52) U.S. Cl.
CPC ......... *H02M 3/33515* (2013.01); *H02M 1/08* (2013.01)

(58) Field of Classification Search
CPC .. H02M 3/33515; H02M 1/08; H02M 1/0009; H02M 1/0058; H02M 1/083; H02M 3/33507
See application file for complete search history.

(56) References Cited

U.S. PATENT DOCUMENTS

| | | | |
|---|---|---|---|
| 7,511,929 B2 | 3/2009 | Hachiya | |
| 9,083,250 B2 * | 7/2015 | Adragna | H02M 3/33507 |
| 10,804,806 B1 * | 10/2020 | Finkel | H02M 3/33523 |
| 11,005,364 B1 * | 5/2021 | Radic | H02M 1/44 |
| 11,482,935 B2 * | 10/2022 | Cacciotto | H02M 3/33523 |
| 2003/0090254 A1 | 5/2003 | Strijker | |
| 2010/0315838 A1 | 12/2010 | Mao et al. | |
| 2011/0182088 A1 | 7/2011 | Lidak et al. | |
| 2011/0261596 A1 | 10/2011 | Zong et al. | |
| 2012/0113689 A1 | 5/2012 | Chen et al. | |
| 2013/0258723 A1 | 10/2013 | Fang et al. | |

OTHER PUBLICATIONS

Adragna, C., "Minimize Power Losses of Lightly Loaded Flyback Converters with the L5991 PWM Controller," STMicroelectronics, AN1049 Application Note, Mar. 2000, pp. 1-24.

* cited by examiner

*Primary Examiner* — Kyle J Moody
(74) *Attorney, Agent, or Firm* — Seed IP Law Group LLP

(57) ABSTRACT

A control circuit for an electronic converter is generates a drive signal of the electronic converter by setting the drive signal to a first logic level in response to a switch-on signal, and to a second logic level in response to a switch-off signal. The control circuit comprises a valley detection circuit and a combinational logic circuit. The control circuit comprises a blanking circuit configured to generate the blanking signal by determining a blanking time, and asserting the blanking signal when the blanking time elapses since the start of the switch-on or the switch-off interval. The control circuit comprises a blanking time adaption circuit to adapt the blanking time as a function of a blanking time adaption signal based on the input voltage, and to increase the blanking time when the input voltage increases, and decrease the blanking time when the input voltage decreases.

18 Claims, 10 Drawing Sheets

CONTROL CIRCUIT FOR AN ELECTRONIC CONVERTER, RELATED INTEGRATED CIRCUIT, ELECTRONIC CONVERTER AND METHOD

BACKGROUND

Technical Field

The embodiments of the present description refer to a control device for an electronic converter, such as a flyback converter, in particular quasi-resonant electronic converters.

Description of the Related Art

Electronic converters, such as for example AC/DC or DC/DC switched mode power supplies, are well known in the art. There exist many types of electronic converters that may be divided mainly into isolated and non-isolated converters. For example, non-isolated electronic converters are converters of the buck, boost, buck-boost, Cuk, SEPIC, and ZETA types. Instead, isolated converters comprise a transformer, such as flyback and forward converters. These types of converters are well known to the person skilled in the art.

For example, FIG. 1 shows an example of a flyback converter.

In the example considered, the electronic converter 20 comprises a first and a second input terminal 200a and 200b for receiving a DC input voltage Vin and a first and a second output terminal 202a and 202b for providing a DC output voltage Vout. For example, the input voltage Vin may be supplied by a DC voltage source 10, such as a battery. Generally, the DC input voltage Vin may also be generated from an AC voltage via a rectifier circuit, such as a bridge rectifier. Conversely, the output voltage Vout may be used to supply an electric load 30.

A flyback converter comprises a transformer T comprising a primary winding T1 and a secondary winding T2. Specifically, a first terminal of the primary winding T1 is connected (e.g., directly) to the (positive) input terminal 200a and a second terminal of the primary winding T1 is connected (e.g., directly) via (the current path of) an electronic switch SW to the (negative) input terminal 200b, which often represents a ground. Accordingly, the electronic switch SW is configured to connect the primary winding selectively to the input terminals 200a and 200b, e.g., the voltage Vin. For example, in the example considered, the electronic switch SW is implemented with a n-channel Field Effect Transistor (FET), such as a n-channel Metal-Oxide-Semiconductor Field-Effect Transistor (MOSFET), e.g., a NMOS. In this case, the drain terminal of the transistor SW is connected to the second terminal of the primary winding T1, representing a switching node SN of the flyback converter, and the source terminal of the transistor SW is connected to the terminal 200b.

Moreover, in the example considered, a diode D and the secondary winding T2 are connected (e.g., directly) in series between the output terminals 202a and 202b. For example, a first terminal of the secondary winding T2 may be connected (e.g., directly) via the diode D to the (positive) output terminal 202a and a second terminal of the secondary winding T2 may be connected (e.g., directly) to the (negative) output terminal 202b. Generally, in addition or as alternative to the diode D may be used an electronic switch. Accordingly, the diode (and/or the electronic switch) D is configured to selectively connect the secondary winding T2 to the output terminals 202a and 202b.

Moreover, a capacitor C is often connected (e.g., directly) between the terminals 202a and 202b.

As well-known, a conventional flyback converter 20 is operated via a control circuit 210 essentially configured to drive the electronic switch SW with a respective drive signal DRV in order to regulate the output voltage Vout or the output current Iout provided via the terminals 202a and 202b to a given reference value. For example, for this purpose, in some embodiments, the control circuit 210 is configured to drive the switch SW periodically with two switching states having respective durations $T_{ON}$ and $T_{OFF}$. During the interval $T_{ON}$, when the switch SW is closed and the diode/switch D is opened, the primary winding T1 of the transformer T1 is (directly) connected to the input voltage Vin. Accordingly, the primary current Ipri and the magnetic flux in the transformer T increases, thereby storing energy in the transformer T. In this condition, the capacitor C supplies energy to the output terminals 202a and 202b, e.g., the load 30. Conversely, during the interval $T_{OFF}$, when the switch SW is opened and the diode/switch D is closed, the primary current Ipri drops to zero, while a secondary side current Isec starts flowing in the secondary winding, and the energy from the transformer core T recharges the capacitor C and supplies the load 30.

Specifically, in an ideal flyback converter, when the control circuit 210 turns off the electronic switch SW, the current Ipri in the primary winding T1 stops immediately, while the current starts to flow in the secondary side T2, because the diode/switch D closes. In a real transformer T, anyway, the two windings T1 and T2 are not perfectly coupled, and a leakage inductance remains in the primary side. Substantially, such a leakage inductance may be modelled via an inductance $L_S$ connected in series with the primary winding T1. Conversely, the magnetizing inductance of the transform T (used to model the magnetic flux) may be modelled with an inductance $L_M$ connected in parallel with the primary winding T1.

Thus, when the control circuit 210 turns off the electronic switch SW, the primary current Ipri continues to flow in the primary side T1 due to the leakage inductance $L_S$, thereby creating a spike on the primary winding T1. Specifically, the electronic switch SW has associated a parasitic capacitance CSW connected in parallel with the electronic switch SW, such as the parasitic drain-source capacitance of a respective FET. Thus, the current provided by the leakage inductance $L_S$ of the transformer T will charge this capacitance CSW. Typically, such a spike is followed by a ringing, which attenuates due to losses in the system, until all the energy, which was stored in the leakage inductance $L_S$ (when the electronic switch SW has been turn off), is dissipated.

In order to reduce this effect, flyback converters comprise often a snubber/clamp circuit 204.

For example, FIG. 2 shows an embodiment of such a snubber/clamp circuit 204.

Specifically, in FIG. 2, the clamp circuit 204 is connected in parallel with the primary winding T1 of the transformer T, and comprises a series connection of a clamp capacitor CS and a diode DS, e.g., the clamp capacitor CS and the diode DS are connected in series between the terminals of the primary winding T1. Generally, in addition or as alternative to the diode DS may be used an electronic switch. Often a resistor RS is connected (e.g., directly) in parallel with the capacitor CS.

Accordingly, the diode/switch DS is configured to selectively connect the capacitor CS and the resistor RS in parallel with the primary winding T1.

Specifically, in the example considered, a first terminal of the primary winding T1 is connected (e.g., directly) to a first terminal of the capacitor CS and a second terminal of the primary winding T1 (e.g., switching node SN) is connected (e.g., directly) via the diode/switch DS to the second terminal of the capacitor CS.

Substantially, the addition of the capacitor CS and the diode/switch DS permits to deviate the energy in the leakage inductance $L_S$ into the clamp capacitor CS. Specifically, when the control circuit 210 turns off the electronic switch SW, the switching node SN (between the primary winding T1 and the electronic switch SW, e.g., the drain terminal of the transistor SW) rises as in a normal flyback converter (without clamp). Anyway, when the voltage at the switching node SN bypasses the voltage at the clamp capacitor CS, the diode/switch DS turns on and the primary current Ipri flows also to the capacitor CS until the primary current Ipri drops to zero. When using a switch DS, the energy stored on the capacitor CS may be given back to the system by turning on the electronic switch DS. Alternatively, the capacitor CS may discharge via the resistor RS.

Thus, typically the clamp circuit 204 is operated in a complementary mode, e.g., the diode/switch DS is opened when the electronic switch SW is closed, and the diode/switch DS is closed (often after a brief dead-time) when the electronic switch SW is opened.

As mentioned before the control circuit 210 is configured to drive the electronic switch SW with a switch-on duration $T_{on}$ and a switch-off duration $T_{off}$, and by varying the switch-on duration $T_{on}$ and/or the switch-off duration $T_{off}$ the control circuit 210 may control the energy transfer to the secondary side.

For example, a known solution consists in a Pulse-Width Modulation (PWM) of the drive signal DRV, wherein the duration $T_{SW}=T_{ON}+T_{OFF}$ of a switching cycle is constant, but the duty cycle $T_{ON}/T_{SW}$ is varied in order to obtain a given output voltage Vout or output current Iout.

Another type of control is based on a Quasi-Resonant (QR) switching operation of the flyback converter. Specifically, in this case, the control circuit 210 is configured to switch-on the switch SW after the transformer demagnetization (e.g., when the secondary current Isec has become zero).

FIG. 3 shows in this respect an example of the voltage $V_{SN}$ at the switching node SN.

Specifically, as mentioned before the control circuit 210 is configured to close the switch SW for a given interval $T_{ON}$, e.g., by setting the drive signal DRV to high. Accordingly, the switch SW is opened at an instant $t_1$.

Once the switch SW is opened, the primary side current Ipri is still positive and thus charges the capacitances CSW associated with the switching node SN. As mentioned before, once exceeded the voltage at the capacitor CS, the primary side current Ipri will also charge the capacitor CS, and the voltage $V_{SN}$ at the switching node SN reaches a value Vin+$V_R$, where $V_R$ is the "reflected" voltage, e.g., the voltage at the secondary winding T2, e.g., the output voltage Vout, reported to the primary side T1 based on the turn ratio of the transformer T.

Once the voltage at the secondary side T2 becomes zero/negative, e.g., when the transformer T is demagnetized, the diode/switch D opens. Thus, the inductances of the transformer T (magnetizing inductance $L_M$ and leakage inductance $L_S$) are now connected with the capacitance CSW in series between the input terminals 200a and 200b, essentially implementing a LC resonant circuit, whereby a resonance with an amplitude $V_R$ and a period $T_R$ is generated (oscillating around Vin). Due to this resonance and also taking into account that the reflected voltage $V_R$ is usually smaller than Vin, the voltage $V_{SN}$ will decrease according to a (damped) oscillation, reaching minimum values at instants $t_3$, $t_3'$, $t_3''$, etc. Thus, by switching on the switch SW at one of the instants $t_3$, $t_3'$, $t_3''$, etc., (so called valley points) the switching losses may be reduced.

For example, FIG. 4 shows a possible implementation of the operation of the control circuit 210.

Specifically, in line with the description of FIG. 2, the control circuit 210 is configured to generate a drive signal DRV for the electronic switch SW connected in series with the primary winding T1 between the terminals 200a and 200b, wherein the intermediate node between the primary winding T1 and the electronic switch SW represents the switching node SN. Moreover, also in this case a clamp circuit 204 is connected to the switching node SN and a capacitance CSN is associated with the switching node SN, which is schematically shown via a capacitance connected between the switching node SN and the terminal 200b (ground). Generally, the capacitance CSN comprises the parasitic capacitance CSW of the electronic switch SW, possible other parasitic capacitances (e.g., of the traces of a respective printed circuit board) and optionally one or more capacitors connected to the switching node SN.

In the example considered, the control circuit 210 has associated:
- a feedback circuit 212 configured to provide a feedback signal FB indicative of (e.g., proportional to) the output power $P_{OUT}$;
- a current measurement circuit 214 configured to generate a signal CS indicative of (e.g., proportional to) the current Ipri flowing through the primary winding T1 (at least) during the switch-on period $T_{ON}$; and
- a valley monitoring circuit 216, configured to generate a signal ZCD indicative of the valleys in the voltage $V_{SN}$ at the switching node SN, such as a demagnetization monitoring circuit configured to generate a signal indicative of magnetization and demagnetization of the transformer T (at least) during the switch-off period $T_{OFF}$.

For example, in order to generate the signal FB indicative of the output power $P_{OUT}$, the feedback circuit 212 may measure both the output current iout and the output voltage Vout. However, in case of an electronic converter configured as regulated voltage source, the feedback circuit 212 may implement a regulator circuit comprising an Integral (I) component, and optionally a Derivative (D) and/or Proportion (P) component, wherein the regulator circuit is configured to compare the output voltage Vout with a reference signal and vary the feedback signal, via the I (and optionally P and/or D) component until the output voltage Vout corresponds to the reference signal. In fact, in this case, in the steady state conditions, the feedback signal FB is proportional to the output current iout, and due to the fact that the output voltage Vout is constant, the feedback signal FB is proportional to the output power $P_{OUT}$. Similarly, also in case of an electronic converter configured as regulated current source, the feedback circuit 212 may implement a regulator circuit comprising an Integral (I) component, and optionally a Derivative (D) and/or Proportion (P) component. However, in this case, the regulator circuit is configured to compare the output current iout with a reference signal and vary the feedback signal, via the I (and optionally P and/or D) component until the output current iout corresponds to the reference signal. In fact, in this case, in the steady state conditions, the feedback signal FB is proportional to the output voltage Vout, and due to the fact that the output current iout is constant, the feedback signal FB is proportional to the output power $P_{OUT}$.

The current measurement circuit 214 may be implemented in any suitable manner. For example, in FIG. 4, the current measurement circuit 214 is implemented with a current sensor, such as a resistor RCS, connected in series with the switch SW, e.g., between the source terminal of a respect n-channel FET SW, and the terminal 200b (ground), wherein the voltage (corresponding to the signal CS) at the resistor RCS is proportional to the current flowing through the switch SW.

In the example considered, the valley/demagnetization monitoring circuit 216 is implemented with an auxiliary winding of the transformer T, whereby the voltage at the auxiliary winding is indicative of the magnetization of the transformer T (at least) during the switch-off period $T_{OFF}$, because the voltage reaches zero when the transformer T is demagnetized. Moreover, in the example considered, the demagnetization monitoring circuit 216 comprises an optional voltage divider, e.g., implemented with two resistors R1 and R2 connected (e.g., directly) in series between the terminals of the auxiliary winding Taux, wherein, in some embodiments, preferably one of the terminals of the auxiliary winding Taux is connected to the terminals 200b (ground). Thus, in the example considered, the voltage at the resistor R1 (corresponding to the signal ZCD) is proportional to the voltage at the terminals of the auxiliary winding Taux.

In general, one or more of the following circuits may also be implemented together with the control circuit 210 in an integrated circuit:
  the electronic switch SW;
  at least part of the feedback circuit 212;
  the current measurement circuit 214; and/or
  the voltage divider R1/R2.

Accordingly, the control circuit 210 may generate the drive signal DRV as a function of the signals CS, FB and ZCD. For example, the control circuit 210 may:
  open the electronic switch SW, e.g., set the signal DRV to low, when the signal CS reaches a given reference value, wherein the reference value is determined as a function of the feedback signal FB; and
  close the electronic switch SW, e.g., set the signal DRV to high, when the signal ZCD reaches zero or becomes negative, which indicates a valley in the voltage $V_{SN}$/a demagnetization of the transformer T.

For example, the feedback circuit 212 or the control circuit 210 may implement a regulator having at least an integral (I) component, whereby the reference value for the comparison with the signal CS is increase/decreased until the output quantity (Vout or Iout) corresponds to a given requested value.

Thus, essentially, the switch SW is switched off at a given peak value of the current Ipri and switched on at one of the valley points $t_3$. Specifically, in such a current-mode QR flyback converter, the switching activity is achieved by synchronizing the turn-on of the switch SW with the valley of the voltage $V_{SN}$/transformer demagnetization, e.g., by detecting the resulting negative-going edge of the voltage across the auxiliary winding Taux of the transformer T, which is connected to a pin of the control circuit 210, usually called zero-current detection pin (ZCD pin).

Thus, the solution shown in FIG. 4 work close to the boundary between discontinuous (DCM) and continuous conduction (CCM) of the transformer T, with a mode of operation which is commonly called "valley switching".

Usually a QR flyback converter is switched at the first valley, which (as shown in FIG. 3) occurs after a time $T_V$ between the demagnetization instant (instant $t_2$) and the first valley (instant $t_3$), wherein this time $T_V$ corresponds to half of the resonance period $T_R$, e.g., $T_V=T_R/2=1/(2f_R)$.

Specifically, concerning the operation of the converter described with respect to FIG. 4, the switching frequency $f_{SW}$ of a QR flyback converter can be expressed by the following equation:

$$f_{SW} = \frac{2 \cdot f_T}{1 + \frac{f_T}{f_R} + \sqrt{1 + 2 \cdot \frac{f_T}{f_R}}} \quad (1)$$

where $f_R$ is the resonance frequency between the inductance $L_P$ of the primary winding T1 (e.g., $L_P=L_S+L_M$) and the capacitance CSN associated with the switching node SN, e.g.:

$$f_R = \frac{1}{2\pi\sqrt{L_P \cdot C_{SN}}} \quad (2)$$

and $f_T$ is the transition frequency, which corresponds to the frequency the converter would operate at if the converter would work in the transition mode, e.g., at the boundary between the continuous and the discontinuous conduction mode, e.g., with $T_R=1/f_R \to 0$, e.g.:

$$f_T = \frac{V_R^2}{2 \cdot P_{INT} \cdot L_P(1+M)^2} \quad (3)$$

where $V_R$ is again the reflected voltage (e.g., the output voltage Vout reported to the primary winding T1 through the primary-to-secondary turn ratio), the parameter M is the ration $V_R$/Vin, and $P_{INt}$ is the transformer's input power.

As described in the foregoing, a QR flyback converter has many advantages compared to a fixed frequency (PWM) operation, in particular the reduction of switching losses, because the switch SW is closed when the voltage across the switch SW reaches a minimum value.

However, a QR flyback converter has also disadvantages, in particular deriving from the variable frequency, depending on the operative conditions. In fact, as shown in equations (1), (2) and (3), the switching frequency $f_{SW}$ increases as the input voltage Vin increases and/or the load decreases. This behavior may have a big impact in the converter switching losses, which could it render difficult to meet efficiency recommendations and regulation, such as EuP, EU CoC or DoE.

To overcome this issue, the control circuit 210 may be configured to not switch the switch SW at the first valley ($t_3$) but at one of the following valleys ($t_3'$, $t_3''$, etc.), thereby preventing that the switching frequency $f_{SW}$ exceeds a given threshold value. For example, for this purpose, in some embodiments, the control circuit 210 may comprise a circuit configured to mask the signal ZCD or a respective trigger signal $T_{ZCD}$ generated by a zero-current-detector/comparator of the control circuit 210 as a function of the signal ZCD.

For example, a possible solution consists in masking the triggering signal $T_{ZCD}$ coming from the zero-current-detector/comparator with a timer circuit having a respective blank interval $T_{BLANK}$, which ensures that the switch SW remains opened at least until the interval $T_{BLANK}$ ends. This blanking time $T_{BLANK}$ may start either when the switch SW is turned on (at one of the instants $t_3$) or when the switch SW is turned off (at the instant t). In this way, when one or more pulses of the trigger signal $T_{ZCD}$ is within the $T_{BLANK}$ window, the switch-on of the switch SW is delayed until the first valley occurs after the time $T_{BLANK}$ has elapsed, thereby limiting the maximum value of the switching operating frequency. This function is sometimes referred to as "valley-skipping".

Therefore, the total switching period $T_{SW}$ is given by:

$$T_{DSW} = \frac{1}{f_T} + T_{V(k)} \qquad (4)$$

where $T_{V(k)}$ corresponds to the time from the demagnetization of the transformer (instant $t_2$) and the k-th valley, and may be calculated, e.g., by:

$$T_{V(k)} = \frac{2 \cdot k - 1}{2 \cdot f_R} \qquad (5)$$

In general, the blanking time $T_{BLANK}$ may be either fixed or variable. For example, in some commercially available control circuits 210 (implemented in a respective IC), the blanking time $T_{BLANK}$ may is variable as function of the output power $P_{OUT}$, as signaled, e.g., via the feedback level FB, to gradually decrease the operating frequency $f_{SW}$ with the load. Alternatively, may be used the current sense signal CS, because with a lower load, also the (peak value of the) signal CS is smaller.

Therefore, more and more ringing cycles are skipped and the operating frequency gradually decays. For example, based on the load conditions (and thus also based on the input power), the control circuit 210 may operate the electronic converter with the following modes:

- when the input power exceeds a first value, a quasi-resonant mode, wherein the switch SW is switched on with the first valley;
- when the input power is smaller than the first value, a valley skipping mode, wherein one or more of the valleys are skipped in order to limit the switching frequency $f_{SW}$, and
- when the input power is smaller than a second value (which is smaller than the first value), optionally with a burst mode, wherein the control circuit generates one or more switching cycles, e.g., until the output voltage exceeds a given upper threshold, and then waits until the output voltage falls below a given lower threshold.

Generally, such a control circuit 210 may also be used for other QR resonant converters comprising an inductance and at least one electronic switch SW configured to control the current flowing through the inductance, such as an inductor or a transformer. For example, this applies to QR boost and buck-boost converters.

Specifically, as mentioned before, the control circuit 210 is configured to generate a drive signal DRV for the electronic switch SW, wherein the control circuit 210 is configured to generate switching cycles $T_{SW}$ by setting the drive signal DRV to a first logic level for a switch-on duration $T_{ON}$ for closing the electronic switch SW and a second logic level for a switch-off duration $T_{OFF}$ for opening said electronic switch SW.

Specifically, the control circuit 210 may be used when:

- the terminal CS is connected to a current measurement circuit 214 configured to generate a current measurement signal CS indicative of (and preferably, in some embodiments, proportional to) the current (e.g., Ipri) flowing through the inductance during the switch-on duration $T_{ON}$;
- the terminal ZCD is connected to a valley monitoring circuit 216 configured to provide a valley signal ZCD indicative of valleys in the voltage $V_{SN}$ at the electronic switch SW during the switch-off duration $T_{OFF}$; and
- the terminal FB is connected to a feedback circuit 212 configured to provide a feedback signal FB indicative of the output power $P_{OUT}$ of the electronic converter.

BRIEF SUMMARY

Considering the foregoing, various embodiments of the present disclosure provide alternative solutions for driving a quasi-resonant flyback converter.

A control circuit for a flyback converter having distinctive elements according to one or more embodiments provide alternative solutions for driving a quasi-resonant flyback converter. Embodiments moreover concern a related integrated circuit, electronic converter and method.

As mentioned before, various embodiments of the present disclosure relate to a control circuit for an electronic converter. The electronic converter, such as a flyback converter, comprises two input terminals for receiving an input voltage, two output terminals for providing an output voltage or output current to a load, an inductance, and an electronic switch configured to selectively connect the inductance to an input voltage.

In various embodiments, the control circuit is configured to generate a drive signal for the electronic switch. Specifically, the control circuit may be configured to generate switching cycles by setting the drive signal to a first logic level in response to a switch-on signal, thereby closing the electronic switch for a switch-on interval, and setting the drive signal to a second logic level in response to a switch-off signal, thereby opening the electronic switch for a switch-off interval.

In various embodiments, the control circuit comprises a terminal configured to receive a first signal indicative of a current flowing through the inductance during the switch-on interval, a terminal configured to receive a second signal indicative of valleys in the voltage at the electronic switch during the switch-off interval, a terminal configured to receive a third signal indicative of an output power provided by the electronic converter via the two output terminals to the load, and a terminal configured to receive a threshold signal.

For example, for this purpose, in some embodiments, the control circuit may comprise a feedback circuit configured to provide a feedback signal corresponding to the third signal. For example, the feedback circuit may be configured to determine the feedback signal by measuring the output voltage and the output current. Alternatively, the feedback circuit may generate the feedback signal via a regulator having an integral component configured to regulate the output voltage or the output current to a reference value.

In various embodiments, the control circuit comprises a comparison circuit configured to generate the switch-off signal by comparing the first signal with the threshold signal. Conversely, in order to generate the switch-on signal, the control circuit may comprise a valley detection circuit configured to generate a trigger in a trigger signal when the second signal indicates a valley in the voltage at the electronic switch during the switch-off interval.

Specifically, in various embodiments, the control circuit comprises a combinational logic circuit configured to generate the switch-on signal by masking the trigger signal in response to a blanking signal.

Accordingly, in various embodiments, the control circuit comprises also a blanking circuit configured to generate the blanking signal. For example, the blanking circuit may be configured to determine a blanking time as a function of the third signal, detect an instant corresponding to a start of the switch-on interval or a start of the switch-off interval and assert the blanking signal when the blanking time elapses since the instant.

For example, the blanking circuit may be configured to determine the blanking time by detecting whether the third signal indicates that the output power is greater than a first threshold and smaller than a second threshold. In response to determining that the output power is greater than the lower threshold and smaller than the upper threshold, the blanking circuit may increase the blanking time for a decreasing output power. Additionally, in response to determining that the output power is smaller than the lower threshold, the blanking circuit may set the blanking time to a first given value. Moreover, in response to determining that the output power is greater than the upper threshold, the blanking circuit may set the blanking time to a second given value, wherein the second given value is smaller than the first given value.

In various embodiments, the control circuit is configured to adapt the blanking time as a function of the input voltage. Accordingly, in various embodiments, the control circuit comprises further a terminal configured to receive a fourth signal indicative of the input voltage, and a blanking time adaption circuit. Specifically, in various embodiments, the blanking time adaption circuit is configured to generate a blanking time adaption signal as a function of the second measurement signal indicative of the input voltage, and adapt the blanking time as a function of the blanking time adaption signal, wherein the blanking time adaption circuit is configured to increase the blanking time when the fourth signal indicates that the input voltage increases, and decrease the blanking time when the fourth signal indicates that the input voltage decreases. For example, the blanking time adaption circuit may be configured to generate the blanking time adaption signal via a monotonic increasing function of the input voltage, and adapt the blanking time by adding the blanking time adaption signal to the blanking time.

BRIEF DESCRIPTION OF THE SEVERAL VIEWS OF THE DRAWINGS

The embodiments of the present disclosure will now be described with reference to the annexed plates of drawings, which are provided purely to way of non-limiting example and in which.

The features and advantages of the present disclosure will become apparent from the following detailed description of practical embodiments thereof, shown by way of non-limiting example in the accompanying drawings, in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment," "in one embodiment," or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

In FIGS. 5 to 12 described below, parts, elements or components that have already been described with reference to FIGS. 1 to 4 are designated by the same references used previously in these figures. The description of these elements has already been made and will not be repeated in what follows in order not to burden the present detailed description.

Figure 1:
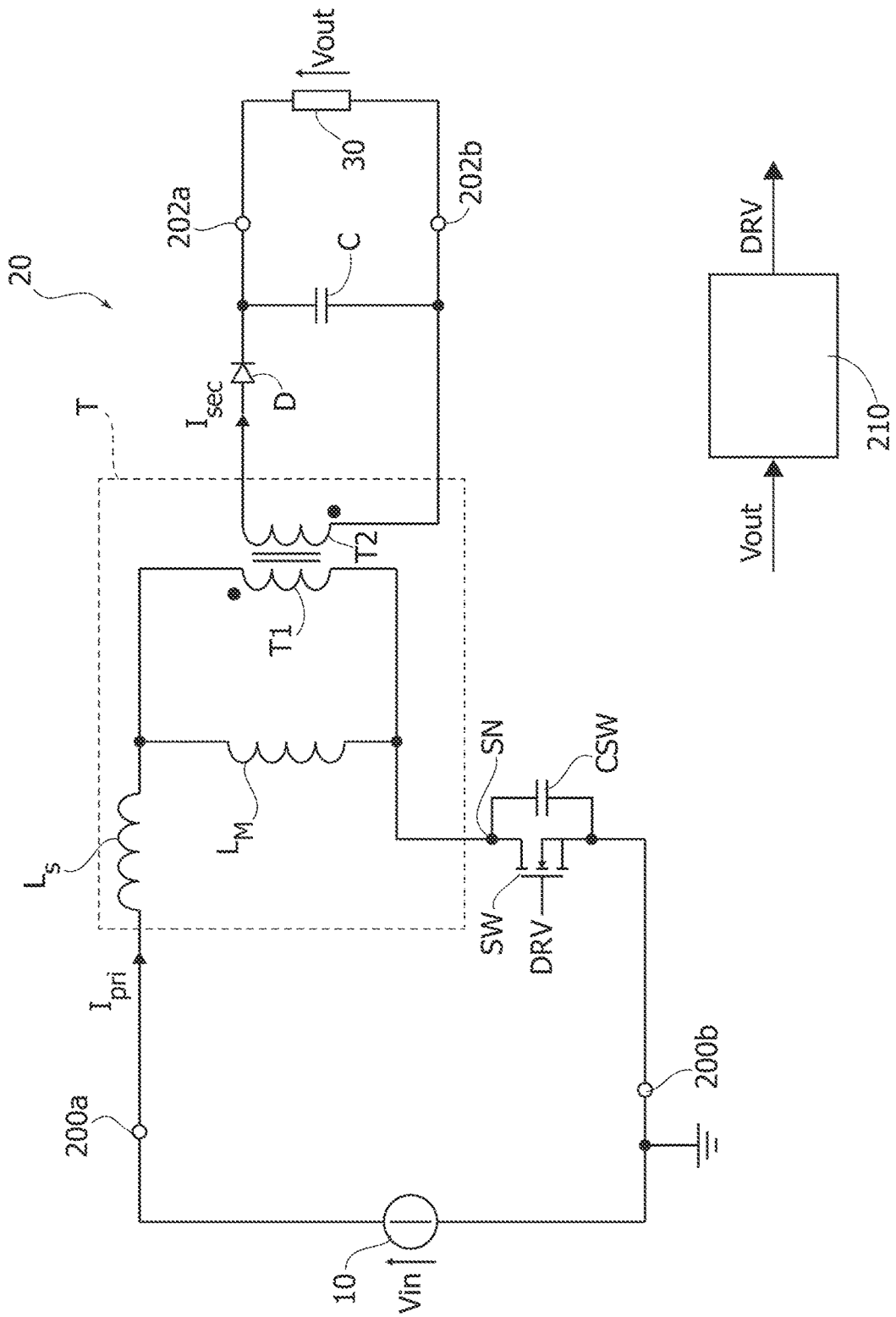
FIG. 1 shows a circuit schematic of a flyback converter.
Figure 2:
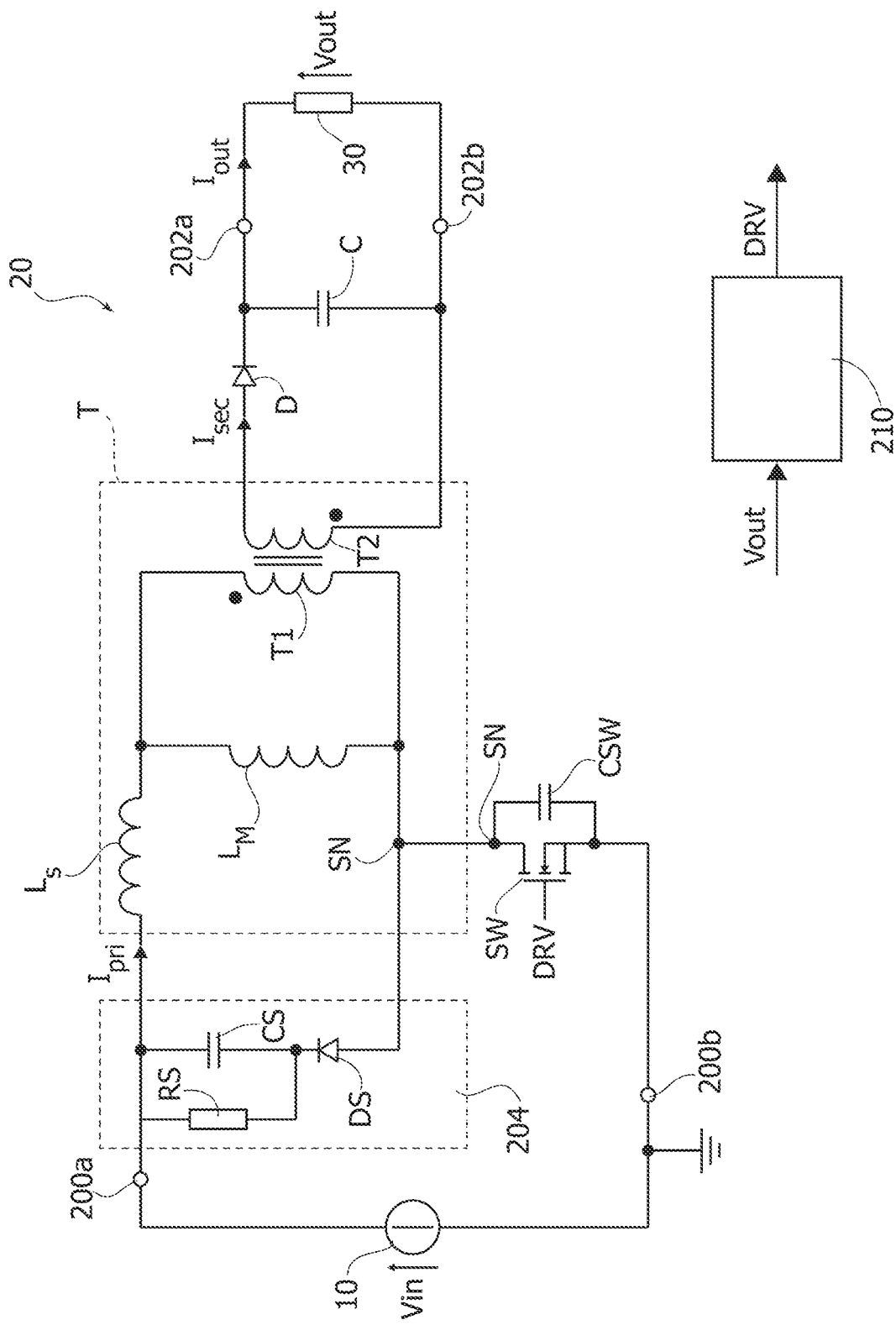
FIG. 2 shows a circuit schematic of a flyback converter with a clamp circuit.
Figure 3:
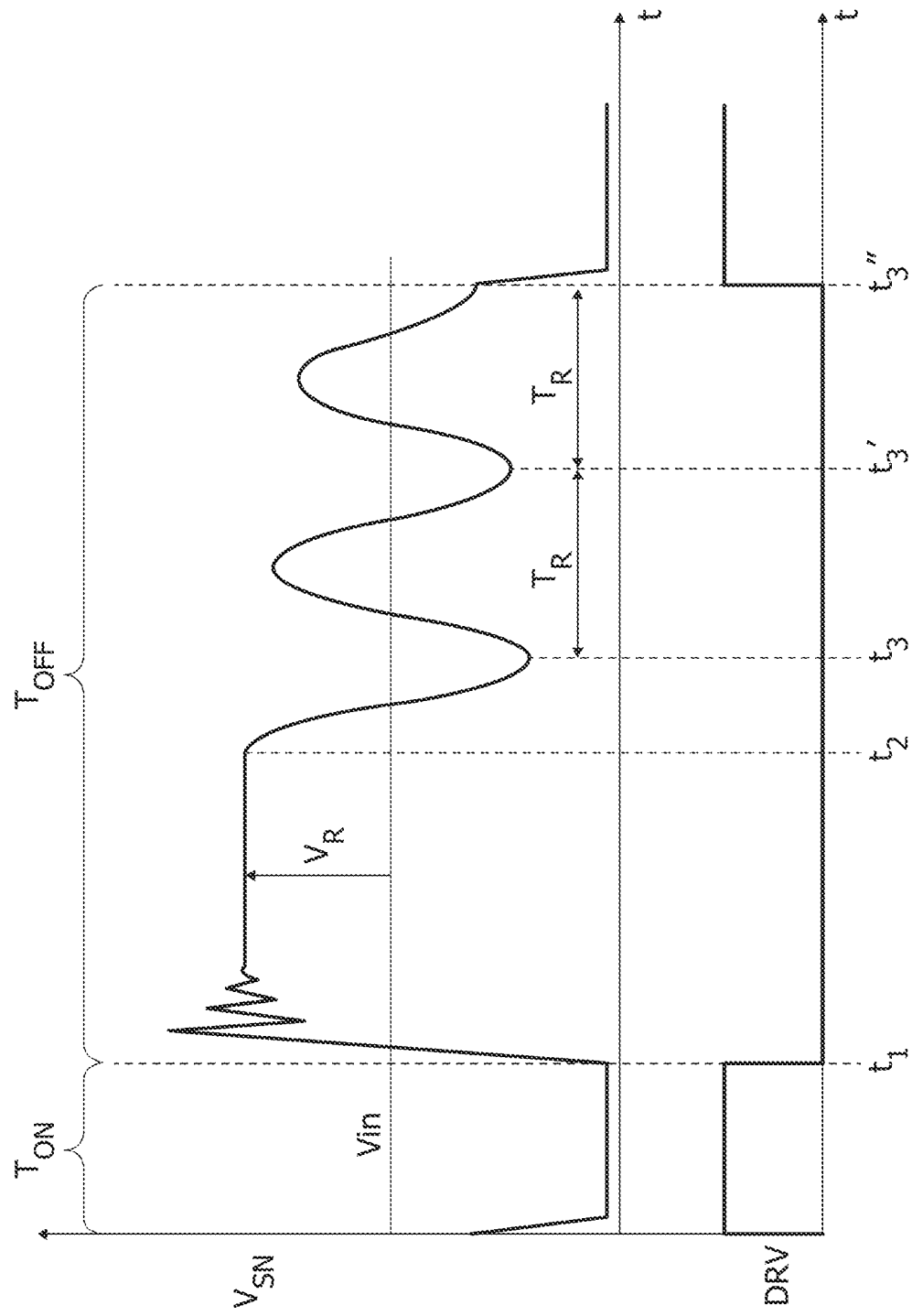
FIG. 3 shows waveforms of the converter of FIG. 2.
Figure 4:
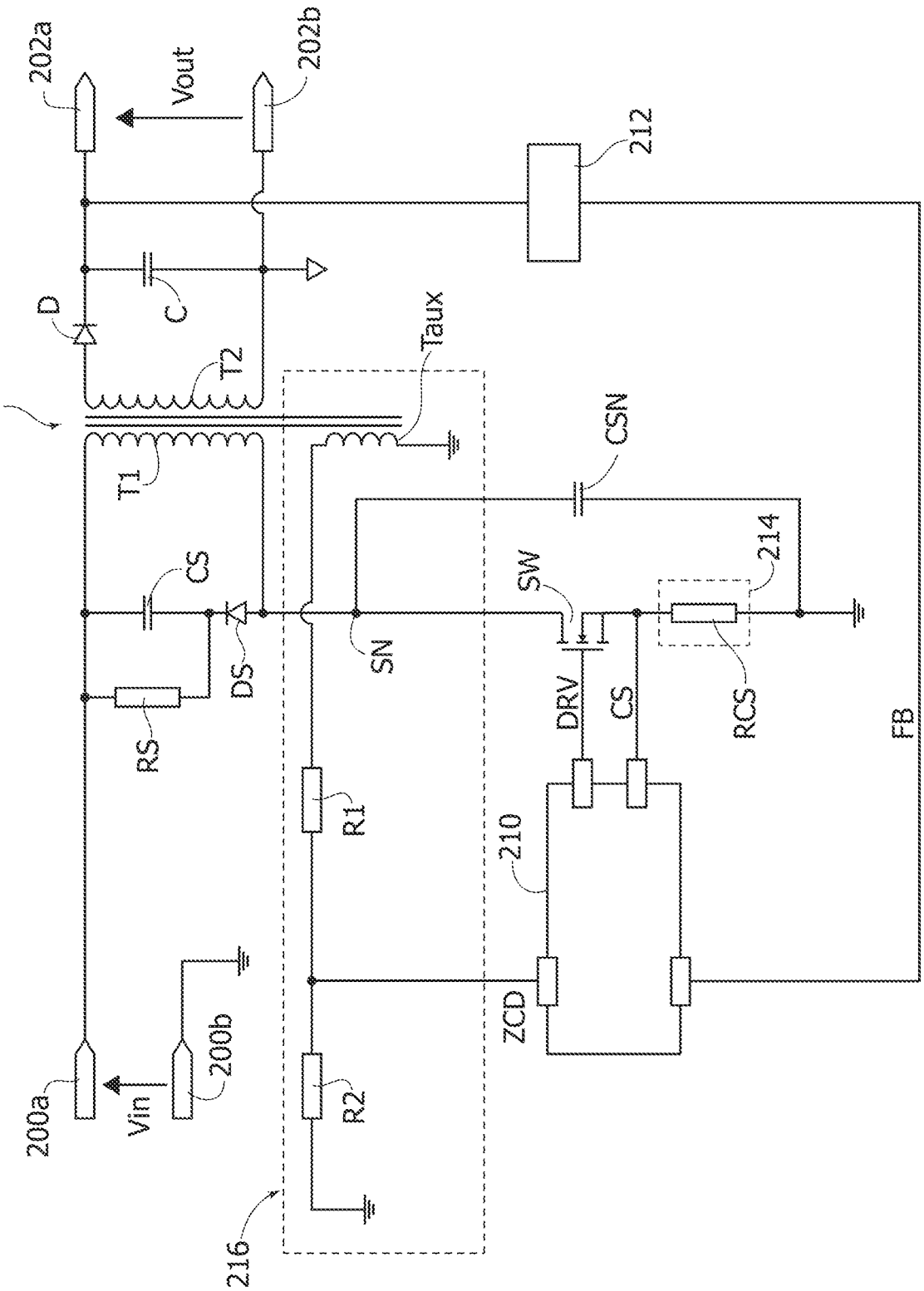
FIG. 4 shows a circuit schematic of a flyback converter comprising a quasi-resonant control circuit.
Figure 5:
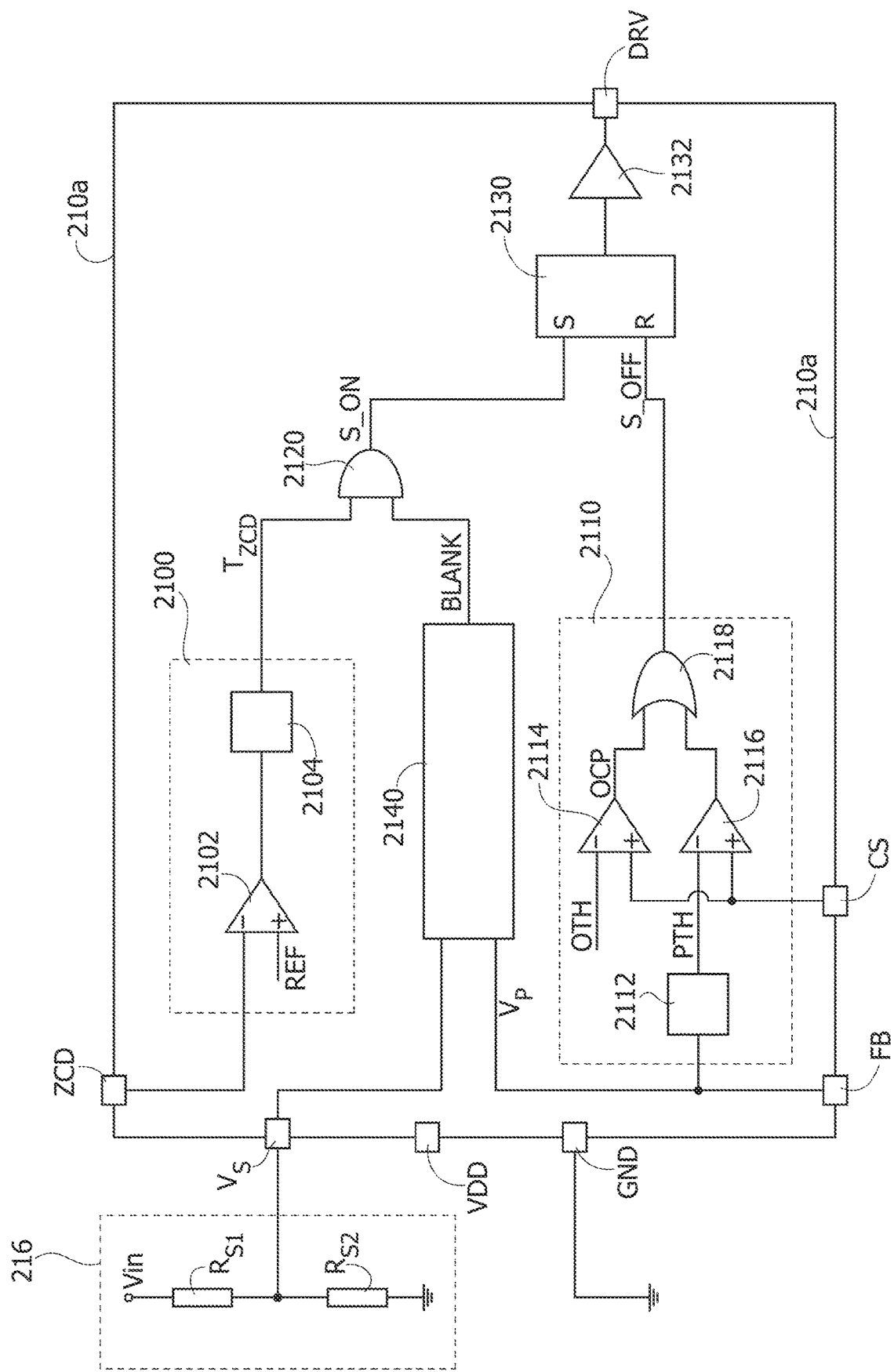
FIG. 5 shows a first embodiment of a quasi-resonant control circuit in accordance with the present disclosure.

FIG. 5 shows an embodiment of a control circuit 210a for an electronic converter according to the present disclosure. For a general description of a quasi-resonant electronic converter, such as a flyback converter, reference can be made to the previous description, in particular with respect to FIGS. 2 and 4.

Generally, also in this case, the control circuit 210a is configured to generate a drive signal DRV for an electronic switch SW of the electronic converter, wherein the electronic switch SW is configured to control the current flowing through an inductance of the electronic converter, such as a primary winding of a transformer T of a flyback converter. Specifically, also in this case, the control circuit 210a is configured to generate switching cycles $T_{SW}$ by setting the drive signal DRV to a first logic level for a switch-on duration $T_{ON}$ for closing the electronic switch SW and a second logic level for a switch-off duration $T_{OFF}$ for opening said electronic switch SW.

Specifically, in the embodiment shown in FIG. 5, the control circuit 210a, such as an integrated circuit, comprises:

two terminals for receiving a supply voltage, such as a (positive) terminal VDD and a ground terminal GND;

a terminal configured to be connected to a feedback circuit 212 providing a feedback signal FB indicative of the output power $P_{OUT}$ provided by the electronic converter;

a terminal configured to be connected to a current measurement circuit 214 configured to generate a signal CS indicative of (e.g., proportional to) the current flowing through an inductance of the electronic converter (at least) during the switch-on period $T_{ON}$, such as the current Ipri flowing through the primary winding T1; and a terminal configured to be connected to a valley/demagnetization monitoring circuit 216 configured to generate a signal ZCD indicative of the valleys in the voltage $V_{SN}$ at the electronic switch SW, e.g., by monitoring the demagnetization of the inductance of the electronic converter.

In the embodiment considered, the control circuit 210a comprises a terminal for providing the drive signal DRV to an external electronic switch SW, such as the gate terminal of a respective n-channel FET, e.g., a NMOS.

Figure 6:
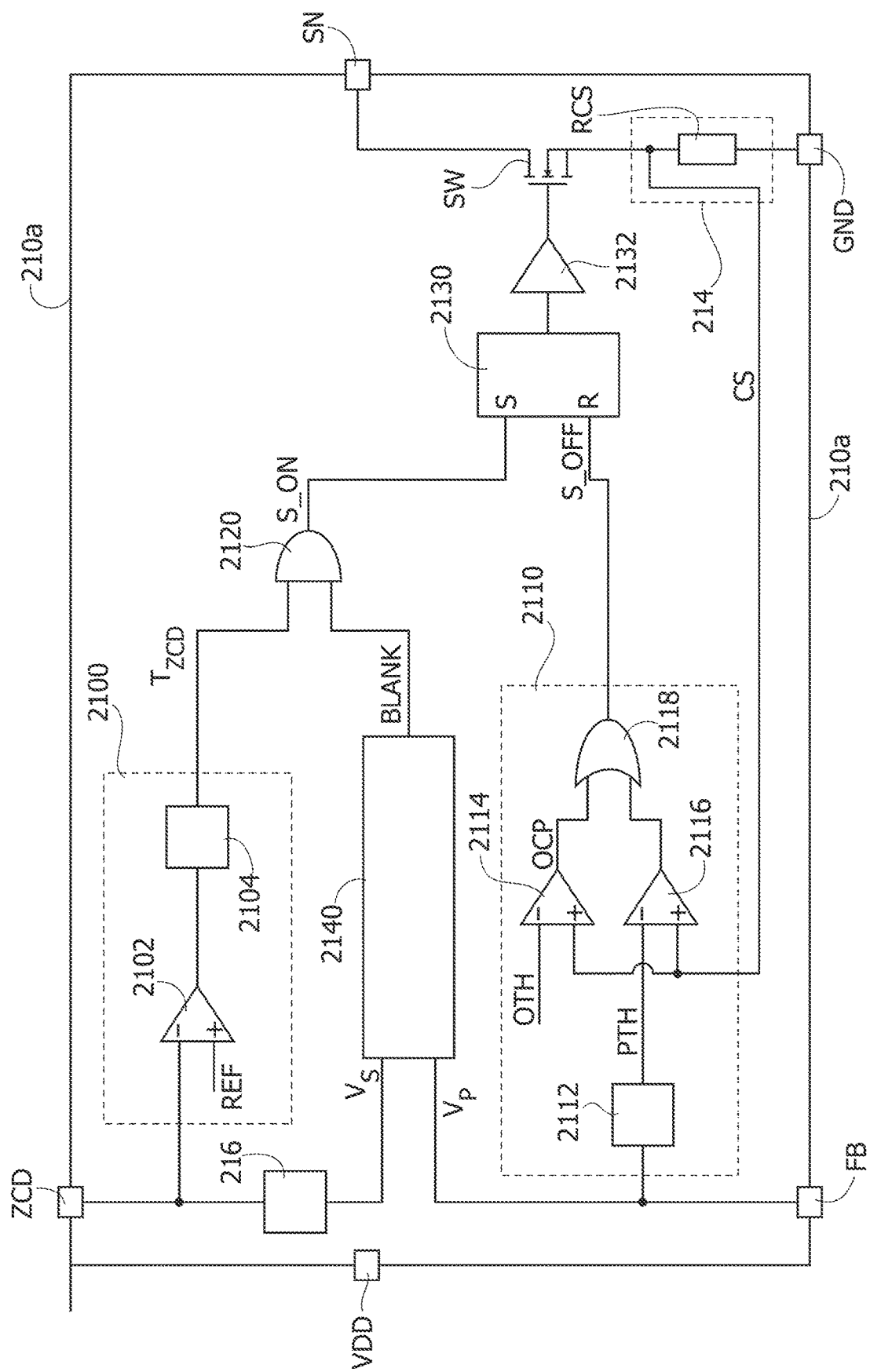
FIG. 6 shows a second embodiment of a quasi-resonant control circuit in accordance with the present disclosure.

Conversely, FIG. 6 shows an embodiment, wherein the electronic switch SW is integrated in the integrated circuit of the control circuit 210a. In this case, the control circuit 210a may comprise a terminal configured to be connected to the switching node SN. For example, when the electronic switch SW is an n-channel FET, e.g., a NMOS, the drain terminal of this n-channel FET SW may be connected (e.g., directly) to the terminal SN.

In various embodiments, the current measurement circuit 214 may be implemented with a current sensor, such as a resistor RCS, connected in series with the switch SW, e.g., between the source terminal of a respect n-channel FET SW, and the ground terminal GND, wherein the voltage at the resistor RCS is proportional to the current flowing through the switch SW. Also in this case, the current measurement circuit 214, e.g., the resistor RCS, may be internal (see FIG. 6) or external (see FIG. 5) with respect to the integrated circuit of the control circuit 210a.

In various embodiments, the control circuit 210a comprises a comparison circuit 2110 configured to compare the signal CS indicative of the current flowing through the inductance of the electronic converter with a threshold signal PTH.

Specifically, in various embodiments, the switch SW is switched off when the value CS reaches (or exceeds) the value of the threshold signal PTH. Accordingly, in various embodiments, the comparison circuit 2110 comprises a (preferably, in some embodiments, analog) comparator 2116 configured to generate a signal S_OFF indicating that the switch SW may be switched off by comparing the signal CS with the threshold signal PTH.

In various embodiments, the comparison circuit 2110 comprises also a second (preferably, in some embodiments, analog) comparator 2114 configured to generate a signal OCP by comparing the signal CS with a second threshold signal OTH indicative of a maximum value, thereby implementing an over-current protection. In this case, the signals at the output terminals of the comparators 2116 and 2114 may be combined, e.g., via a logic OR gate 2118, in order to generate the signal S_OFF. In case such an over-current protection is not used, the signal S_OFF may correspond directly to the comparison signal at the output of the comparator 2116.

In various embodiments, the threshold signal PTH is generated as a function of the output power $P_{OUT}$.

For example, as mentioned before, the feedback circuit 212 may already provide a feedback signal FB indicate of the output power $P_{OUT}$, e.g., by:

measuring the output current iout and the output voltage Vout;

in case of a regulated voltage source, generating the feedback signal FB via a regulator with I, and optionally a P and/or D, component based on the output voltage Vout and reference signal; or in case of a regulated current source, generating the feedback signal FB via a regulator with I, and optionally a P and/or D, component based on the output current iout and reference signal.

Accordingly, the control circuit may comprise a regulator circuit 2112 configured to generate the threshold signal PTH as a function of the feedback signal FB. Generally, based on the properties of the feedback circuit 212, this regulator may comprise:

a P component, e.g., in case the feedback circuit comprises already a regulator with I component; and/or an I component, in case the feedback circuit 212 just measures the output power $P_{OUT}$.

Optionally, the regulator circuit 2112 may also comprise a D component.

Generally, part of the feedback circuit 212 may thus also be implemented in the regulator circuit 2112, e.g., the feedback circuit 212 may just measure the output voltage (in case of a regulated voltage source) or the output current (in case of a regulated current source), and provide a respective feedback signal indicative of (e.g., proportional to) the measured quantity, and the regulator circuit 2112 may be implemented with a regulator comprises an I component, and optionally a P and/or D component.

In various embodiments, at least part of the regulator circuit 2112 and/or the feedback circuit 212 may be implemented in the integrated circuit of the control circuit 210a. For example, in FIGS. 5 and 6, the regulator 2112 is implemented directly within the control circuit 210a.

In the embodiment considered, for switching the switch SW on, the control circuit 210a comprises:

a valley/demagnetizing detection circuit 2100 configured to analyze the signal ZCD provided by the valley/demagnetization monitoring circuit 216 and generate a trigger signal $T_{ZCD}$ where the signal ZCD indicates a valley in the voltage $V_{SN}$/demagnetization of the inductance of the electronic converter, such as the transformer T; and a blanking circuit 2140 configured to generate a signal BLANK used to enable the valley/demagnetizing detection circuit 2100.

For example, in the embodiment considered, the valley/demagnetizing detection circuit 2100 comprises:

a comparator 2102 configured to compare the signal ZCD with a reference signal REF, which usually is close to 0 V, wherein the output of the comparator 2102 is set when the signal ZCD falls below the value of the reference signal REF; and an edge detector 2104 configured to generate a pulse in the signal $T_{ZCD}$ when the signal at the output of the comparator 2100 is set.

In the embodiment considered, the valley/demagnetizing detection circuit 2100 is enabled via a logic gate 2120, such as a AND gate, configured to generate a signal S_ON indicating that the switch SW may be switched on as a function of the trigger signal $T_{ZCD}$ and the signal BLANK, e.g., the signal BLANK masks the signal $T_{ZCD}$.

Accordingly, in the embodiment considered, the signals S_ON and S_OFF may be provided to a latch or flip-flop 2130, e.g., the set and reset input of a respective set-reset latch or flip-flop, and the signal at the output of the latch or flip-flop 2130 may be used to drive the switch SW, e.g., via an optional FET driver circuit 2132 configured to generate the drive signal DRV as a function of the signal at the output of the latch or flip-flop 2130.

Thus, in addition to the circuits 2100-2140, (at least) one or more of the following circuits may also be implemented together with the control circuit 210 in an integrated circuit:
- the electronic switch SW;
- the driver circuit 2132;
- at least part of the feedback circuit 212, such as a respective optocoupler;
- the current measurement circuit 214, such as the resistor RCS; and/or
- at least part of the valley/demagnetization monitoring circuit 216, such as the voltage divider R1/R2.

In the embodiments considered, the blanking circuit 2140 is configured to determine the signal BLANK by asserting the signal BLANK when a given blanking time $T_{BLANK}$ has elapsed since:
- the instant when the electronic switch SW is opened, e.g., in response to the signal S_OFF, thereby setting the minimum time of the switch-off period $T_{OFF}$; or
- the instant when the electronic switch SW is closed, e.g., in response to the signal S_ON, thereby setting the minimum time of the switching period $T_{SW}=T_{ON}+T_{OFF}$.

Figure 7:
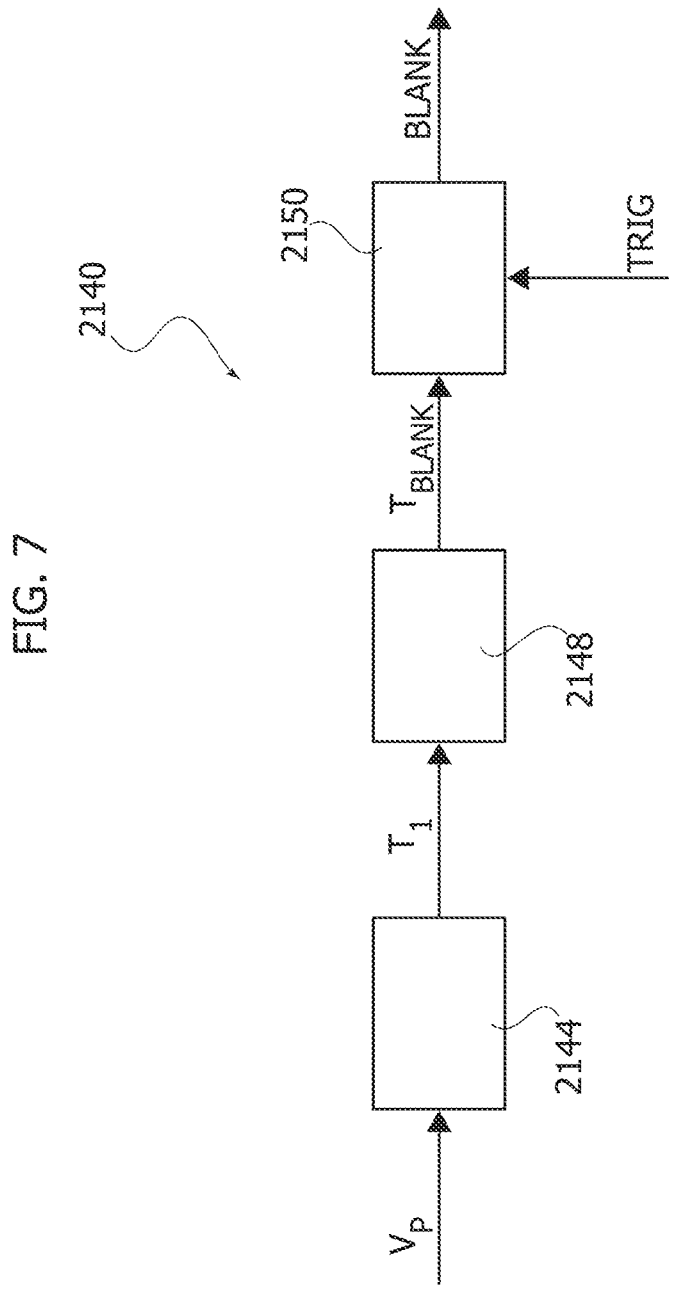
FIG. 7 shows an example of a blanking circuit for the control circuits of FIGS. 5 and 6.

FIG. 7 shows an example of a blanking circuit 2140 configured to determine the blanking time $T_{BLANK}$ as a function of a signal $V_P$ being indicative of (and preferably, in some embodiments, proportional to) the output power $P_{OUT}$ (power provided via the output terminals 202a and 202b of the electronic converter). Alternatively, the signal $V_P$ may be indicative of input power $P_{IN}$ (power received via the input terminals 200a and 200b of the electronic converter). In fact, neglecting possible losses of the electronic converter, the input power $P_{IN}$ may approximately correspond to (or at least may be approximately proportional to) the output power $P_{OUT}$.

In this respect, as mentioned before, the feedback signal FB may already indicate the output power $P_{OUT}$. Accordingly, in various embodiments, the signal $V_P$ is proportional to (e.g., corresponds to) the signal FB. Alternatively, based on the implementation of the circuits 212 and 2112, the signal $V_P$ may be proportional to (e.g., corresponds to) the signal PTH.

In the embodiment considered, the blanking circuit 2140 comprises a timer circuit 2150, such as a digital timer circuit or a time-adjustable monostable, configured to assert the signal BLANK (e.g., set the signal to high or low based on the masking function implemented via the logic gate 2120) once the blanking time $T_{BLANK}$ has lapsed with respect to a trigger received via a trigger signal TRIG. As mentioned before, the trigger signal TRIG may signal the instant when the switch-off period $T_{OFF}$ starts (e.g., TRIG=S_OFF) or preferably the instant when the switch-on period $T_{ON}$ starts (e.g., TRIG=S_ON). Moreover, the (analog and/or digital) timer circuit 2150 may receive any (analog or digital) signal indicating the blanking time $T_{BLANK}$, such as a voltage being proportional to the blanking time $T_{BLANK}$.

In the embodiments considered, the blanking circuit 2140 comprises moreover a blanking time setting circuit 2144 configured to determine the blanking time $T_{BLANK}$ as a function of the signal $V_P$, e.g., the output power $P_{OUT}$, as indicated, e.g., via the signal FB.

Specifically, in case the signal provided by the blanking time setting circuit 2144 does not correspond directly to the signal $T_{BLANK}$ received by the timer circuit 2150, the blanking circuit 2140 may also comprise a conversion circuit 2148 configured to convert the signal provided by the blanking time setting circuit 2144, indicated in the following as signal $T_1$, into the signal $T_{BLANK}$ received by the timer circuit 2150. Generally, the signal $T_1$ may be any suitable analog or digital signal.

For example, in various embodiments, the signals $T_1$ and $T_{BLANK}$ are voltage signals indicating a requested blanking time and the conversion circuit 2148 may be omitted.

Figure 8:
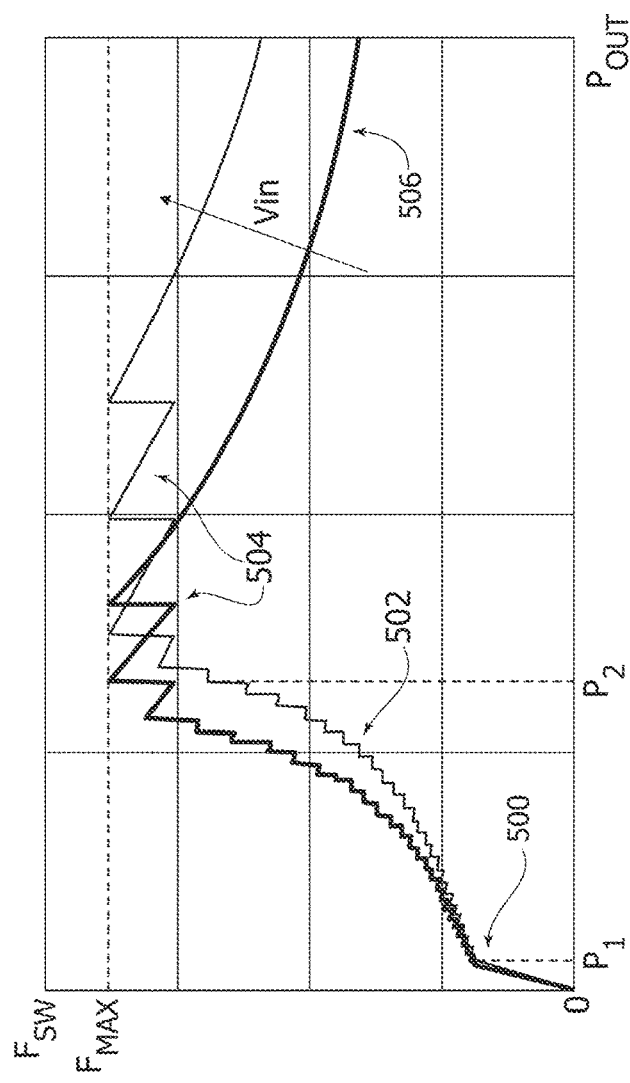
FIGS. 8 and 9 show details of the operation of the blanking circuit of FIG. 7.

For example, FIG. 8 shows schematically an embodiment of the operation of the blanking time setting circuit 2144.

Specifically, at high load conditions (high power $P_{IN}$/$P_{OUT}$), as shown via a line 506, the control circuit 210a operates the electronic converter in the quasi-resonant mode, e.g., the control circuit 210a is configured to close the electronic switch SW at the first valley in the voltage $V_{SN}$ at the electronic switch (instant $t_3$).

When the load decreases, the switching frequency $F_{SW}=1/T_{SW}$ increases. Accordingly, when the load decreases, as shown via a line 504, the control circuit 210a may use a constant blanking time $T_{BLANK}$ for the switching duration $T_{SW}$ (e.g., in the embodiment considered, the time $T_{BLANK}$ starts when the electronic switch SW is closed), thereby limiting the switching frequency $F_{SW}$ to a maximum switching frequency $F_{MAX}$.

At small load conditions, as shown via a line 500, the control circuit 210a may operate the electronic converter in a burst mode, which usually uses a rather low switching frequency $F_{SW}$. In fact, in this case, the switching frequency usually depends intrinsically from the load condition, because one or more switching cycles are performed in order to increase the output voltage Vout above a higher threshold value and then the switching activity is stopped until the output voltage Vout falls below a lower threshold value.

Accordingly, in various embodiments, in order to smoothly pass from the higher switching frequencies $F_{SW}$ of the constant $T_{BLANK}$ time mode 504 (which includes also the QR mode 506), which starts when the power ($P_{IN}$ or $P_{OUT}$) is greater than a threshold $P_2$, to the burst mode 500, which starts when the power ($P_{IN}$ or $P_{OUT}$) is smaller than a threshold $P_1$, the control circuit 210a may be configured to increase the blanking time $T_{BLANK}$ for a decreasing power.

Figure 9:
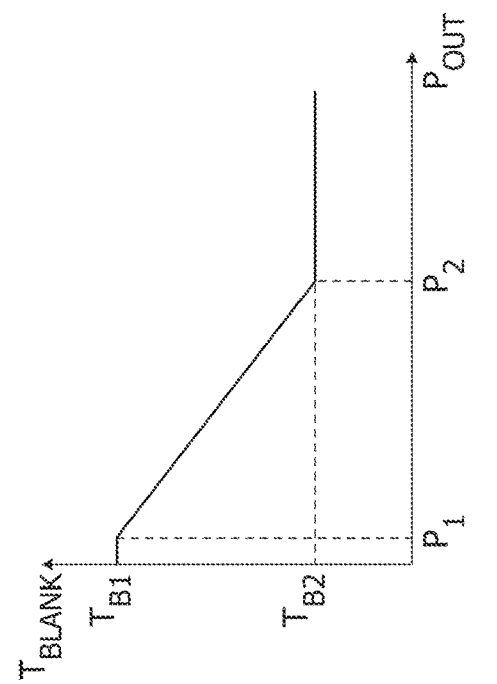

For example, in FIG. 9 is shown an embodiment of the operation of the he blanking time setting circuit 2144.

Specifically, in the embodiment considered, when the load signal $V_P$ is between the thresholds $P_1$ and $P_2$, the blanking time setting circuit 2144 is configured to vary the blanking time $T_{BLANK}$ between a value $T_{B1}$ and a value $T_{B2}$, with $T_{B1}>T_{B2}$, as a function of the load signal $V_P$, wherein the blanking time $T_{BLANK}$ is decreased for increasing load/power conditions, e.g., according to a linear or exponential function.

Moreover, in the embodiment considered, when the load signal $V_P$ is greater than the $P_2$, the blanking time setting circuit 2144 is configured to set the blanking time $T_{BLANK}$ to a predetermined (e.g., constant) value, preferably the value $T_{B2}$. Accordingly, when the signal $V_P$ is greater than the threshold $P_2$, the control circuit 210a uses a predetermined/constant blanking time $T_{B2}$ and with an increasing output power $P_{OUT}$, less valleys are skipped (line 504) until the QR mode (line 506) is reached.

As mentioned before, at lower loads, e.g., when the signal $V_P$ is below the threshold $P_1$, the control circuit 210a may optionally operate the converter in the burst mode. In this mode, the blanking time setting circuit 2144 may be configured to set the blanking time $T_{BLANK}$ to a predetermined (e.g., constant) value, preferably the value $T_{B1}$.

However, as shown via the thinner line in FIG. 8, in an ideal QR converter (mode 506) the switching frequency $F_{SW}$ usually depends also directly on the input voltage Vin. For example, the variability of the input voltage Vin may derive from at least one of:

- from a variable DC input voltage, e.g., provided by a battery; or
- in case the DC input voltage Vin is generated via a rectifier circuit from an AC input voltage, from variable AC input voltages, such as 110 or 230 VAC, or because a small bus capacitor is used, whereby the bus voltage after a rectifier circuit has a ripple.

In fact, with an increasing input voltage, a shorter switch-on time $T_{ON}$ is beneficial until the current flowing through the inductance/the measurement signal CS reaches the requested threshold PTH. For example, this implies that, when the input voltage Vin increases for the same output load 30, the control circuit 210a would switch the electronic switch SW in the QR mode 506 with a higher frequency $F_{SW}$.

Accordingly, in various embodiments, the blanking circuit 2140 is configured to determine the blanking time $T_{BLANK}$ not only as a function of the signal $V_P$ being indicative of (and preferably, in some embodiments, proportional to) the output power $P_{OUT}$, but also as a function of a signal being indicative of (and preferably, in some embodiments, proportional to) the input voltage Vin. Specifically, in this respect, even though the input power $P_{IN}$ may be determined as a function of the input voltage Vin and the input current, indeed the input power $P_{IN}$ is not anymore indicative of the input voltage Vin, because for a constant load, the input current would be regulated, thereby obtaining the same output power $P_{OUT}$ and thus (approximately) the same input power $P_{IN}$.

For example, in the embodiment shown in FIG. 5, the control circuit 210a comprises a terminal configured to be connected to a measurement circuit 216 providing a signal $V_S$ indicative of (and preferably, in some embodiments, proportional to) the input voltage Vin, e.g., $V_S$=k Vin. For example, the measurement circuit 216 may be implemented via a resistive voltage divider, e.g., comprising two resistors $R_{S1}$ and $R_{S2}$, connected between the input voltage Vin and ground GND.

Conversely, FIG. 6 shows an embodiment, wherein the measurement circuit 216 is integrated in the control circuit 210a.

Moreover, in the embodiment considered, the measurement circuit 216 is configured to determine the signal $V_S$ as a function of the signal ZCD. Specifically, during the switch-on periods $T_{ON}$, the inductance of the electronic converter is usually connected to the input voltage Vin. Accordingly, during the switch-on periods $T_{ON}$, an auxiliary winding associated with the inductance (e.g., the winding Taux of the transformer) may provide a voltage, which is proportional to the input voltage Vin. Generally, the signal $V_S$ may also be determined in other ways, e.g., by monitoring the voltage $V_{SN}$ at the electronic switch SW during the switch-off periods.

Figure 10:
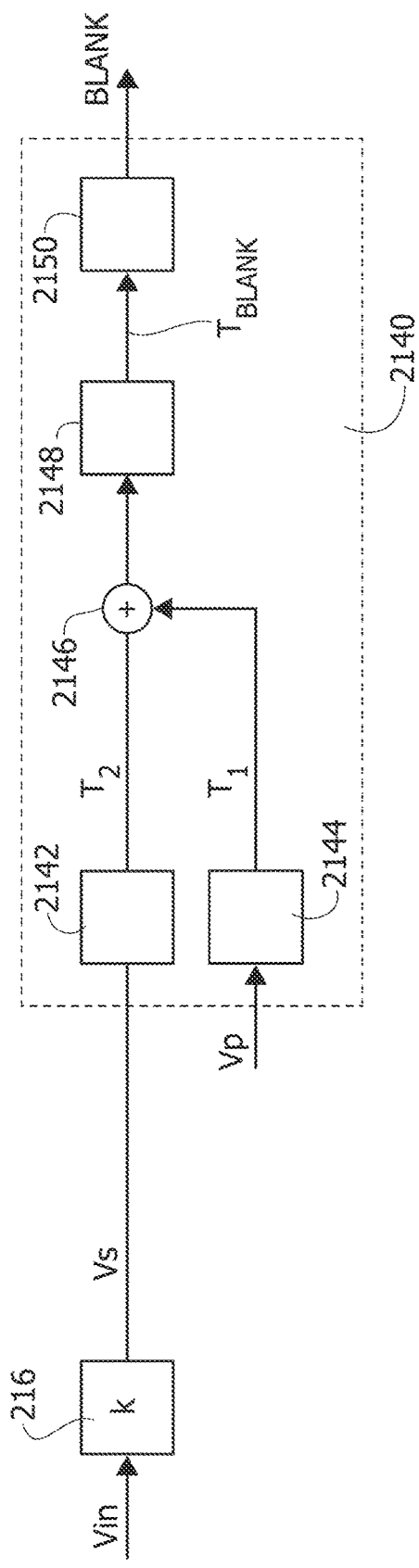
FIGS. 10, 11 and 12 show embodiments of blanking circuits according to the present disclosure.
Figure 11:
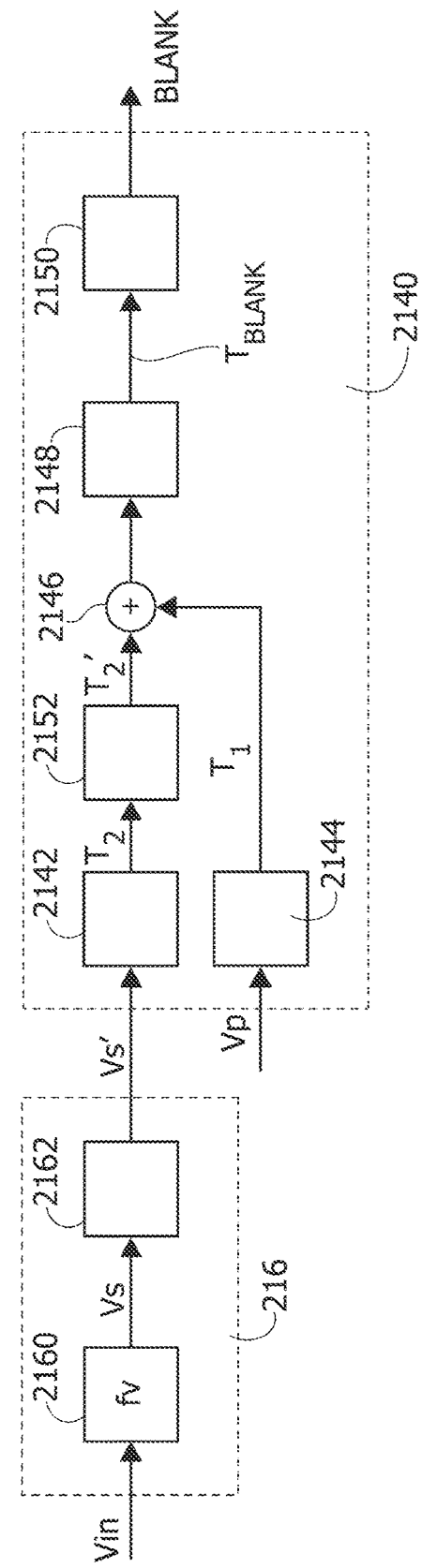

FIGS. 10 and 11 show two possible embodiments of a modified blanking circuit 2140.

Specifically, as mentioned before, the measurement signal $V_S$ is indicative of (and preferably, in some embodiments, proportional) to the input voltage Vin. Specifically, in various embodiments, the signal $V_S$ corresponds to a monotonic increasing (or deceasing) function $V_S=f_V(Vin)$, wherein each value of the input voltage Vin corresponds univocally to a respective value $V_S$, e.g., the input voltage Vin may be determined via the inverse function $Vin=f_V^{-1}(V_S)$. As mentioned before, this does not apply to the input power $P_{IN}$, because the input current in turn is also a function of the input voltage Vin.

Accordingly, in case of a direct measurement of the input voltage Vin as shown in FIG. 10, the measurement signal $V_S$ is preferably proportional to the input voltage Vin, e.g., $V_S=f_V(Vin)$=k Vin.

Conversely, in case of an indirect measurement as shown in FIG. 11, e.g., via the signal ZCD or the voltage $V_{SN}$, the function $f_V$ may also be more complex, but still the signal $V_S$ indicates the input voltage Vin.

FIG. 11 also highlights that the measurement circuit 216 may comprise a sensor circuit 2160 configured to provide a signal $V_S$ indicative of the input voltage $V_S$ and a sample-and-hold circuit 2162, such as an analog sample-and-hold circuit 2162, e.g., implemented with an electronic switch and a capacitor, configured to provide a signal $V_S'$ by selectively storing the signal $V_S$. In fact, as mentioned before, the signal actually monitored by the sensor circuit 2160 may only be indicative of the input voltage Vin during the switch-on period $T_{ON}$ (e.g., the circuit 2162 is configured to sample the signal $V_S$ during the switch-on period $T_{ON}$) or the switch-off period $T_{OFF}$ (e.g., the circuit 2162 is configured to sample the signal $V_S$ during the switch-off period $T_{OFF}$).

In the embodiment considered, the blanking circuit shown in FIG. 7 comprises thus also a blanking time adaption circuit 2142/2146 configured to adapt the signal $T_1$ provided by the blanking time setting circuit 2144 or directly the signal $T_{BLANK}$ received by the timer circuit 2150, e.g., the circuit 2142/2146 may be configured to adapt the signal before or after the optional circuit 2148.

For example, in the embodiment considered, the blanking time adaption circuit 2142/2146 comprises:

a conversion circuit 2142 configured to generate a signal $T_2$ as a function of the signal $V_S$; and an adaption circuit 2146 configured to adapt the signal $T_1/T_{BLANK}$ as a function of the signal $T_2$.

As shown in FIG. 11, in various embodiments, the blanking circuit 2140 may comprise, in addition or as alternative to the circuit 2162, a sample-and-hold circuit 2152 configured to provide a signal $T_2'$ by selectively storing the signal $T_2$. In fact, as mentioned before, the signal actually monitored by the sensor circuit 2160 may only be indicative of the input voltage Vin during the switch-on period $T_{ON}$ or the switch-off period $T_{OFF}$.

Specifically, in various embodiments, the blanking time adaption circuit 2142/2146 is configured to increase the blanking time $T_{BLANK}$ when the input voltage Vin increases, at least when the signal $V_P$ is greater than the threshold $P_2$.

For example, in various embodiments, the conversion circuit 2142 provides a signal $T_2$ being determined via a monotonic increasing function of the input voltage Vin, such as a linear function ($T_2$=m Vin). However, also other functions may be used, which ensure that the signal $T_2$ increases for an increasing input voltage Vin. In this respect, due to the measurement function $f_V$ implemented in the measurement circuit 2160, the conversion circuit 2142 may thus implement any conversion function adapted to obtain the requested final relationship for the signal $T_2$. For example, in case the signal $V_S$ is proportional to the input voltage Vin, the conversion circuit 2142 may generate the signal $T_2$ by just scaling/amplifying the signal $V_S$.

In the embodiment considered, the adaption circuit 2146 is thus configured to adapt the signal $T_1$ (or $T_{BLANK}$) by:
- increasing the signal $T_1$ (or $T_{BLANK}$) when the signal $T_2$ increases; and
- decreasing the signal $T_1$ (or $T_{BLANK}$) when the signal $T_2$ decreases.

For example, in the embodiment considered, the adaption circuit 2146 is configured to add the signal $T_2$ to the signal $T_1$ (or $T_{BLANK}$), e.g., the adaption circuit may be an analog voltage adder. However, the adaption circuit could also implement other function, e.g., multiply the signal $T_2$ with the signal $T_1$.

Accordingly, in the embodiment considered, the timer circuit 2150 is configured to receive a modified blanking time $T_{BLANK}$, which is increased when the input voltage Vin increases.

Figure 12:
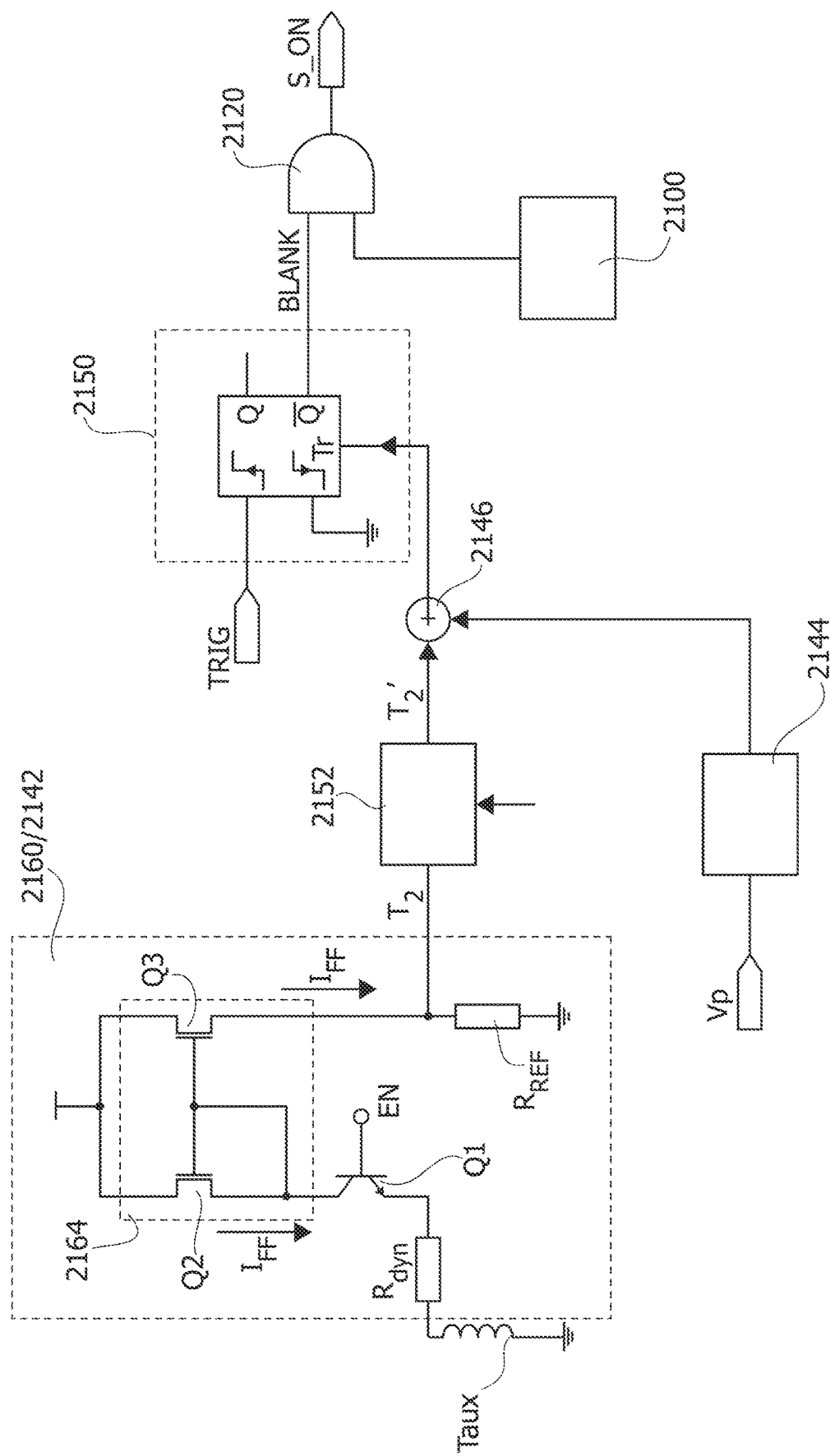

FIG. 12 shows a possible embodiment of the switch-on portion of the control circuit 210a configured to generate the signal S_ON, e.g., the measurement circuit 216, the blanking circuit 2140, the valley/demagnetization detection circuit 2100 and the logic gate 2120.

Specifically, in the embodiment considered, the sensor circuit 2164 comprises a resistor $R_{dyn}$ connected between the auxiliary winding Taux and a reference voltage, such as ground GND.

Accordingly, a current $I_{FF}$ flows through the resistor which is proportional, during the switch-on time $T_{ON}$, to the input voltage Vin, according to a factor dependent of the turn ration Naux/Npri of the windings.

In the embodiment considered, the current $I_{FF}$ is applied via a current mirror 2164 comprising two transistors, Q2 and Q3, to a reference resistor $R_{REF}$, whereby the voltage at the resistor $R_{REF}$ corresponds to the signal $V_S$.

In various embodiments, the sensor circuit may also comprise an electronic switch Q1, such as a transistor, configured to selectively enable the current mirror 2164 as a function of an enable signal EN. Specifically, due to the fact that the resistor Rdyn is connected across the auxiliary winding, the voltage across the auxiliary winding becomes positive during the turn off phases. Accordingly, the control circuit 210a may be configured to:
- during the switch-on periods $T_{ON}$, set the signal EN to a first logic level to close the electronic switch Q1; and
- during the switch-off periods $T_{OFF}$, set the signal EN to a second logic level to open the electronic switch Q1.

For example, the signal EN may be generated as a function of (e.g., may correspond to) the signal at the output of the flip-flop 2130.

Accordingly, in the embodiment considered, the voltage at the resistor $R_{REF}$ increases when the input voltage Vin increases. Accordingly, by adjusting the ratio between the resistors $R_{dyn}$ and $R_{REF}$ and/or the mirroring factor of the current mirror 2164, the voltage at the reference resistor $R_{REF}$ may be scaled in order to directly obtain the requested signal $T_2$, e.g., the conversion circuit 2142 may be implemented directly in the sensor circuit 2160.

In the embodiment considered, the voltage at the resistor $R_{REF}$ (corresponding to the signal $T_2$) is then provided to a sample-and-hold circuit 2152 configured to generate a signal $T_2'$ by storing the signal $T_2$ during the switch-on period $T_{ON}$. Generally, the sample-and-hold circuit 2152 may sample the signal $T_2$ in response to any suitable trigger signal, such as a trigger signal signaling the instant $t_2$ in FIG. 3. However, it is not necessary to sense the voltage for each witching cycle, provided that the sampling rate is (much) higher than the input voltage variation.

In the embodiment considered is also omitted the optional conversion circuit 2148. Accordingly, the signals $T_1$ generated by the blanking time setting circuit 2144 and the signal $T_2'$ by the sample-and-hold circuit 2152 may be provided to the adaption circuit 2146, such as an adder node, which then provides the signal indicating the blanking time $T_{BLANK}$ to the timer circuit 2150. For example, in the embodiment considered, the timer circuit 2150 is implemented with a monostable configured to assert the signal BLANK, once the time blanking time $T_{BLANK}$ has lapsed since a rising edge of the trigger signal TRIG indicating the start of the switch-on interval T_ON. For example, the trigger signal TRIG may correspond to the signal S_ON or may be derived from the drive signal DRV.

Accordingly, in line with the previous description, the blanking signal BLANK may be used to generate the signal S_ON by masking via a logic gate 2120 the trigger signal $T_{ZCD}$ provided by the circuit 2100.

Accordingly, in the embodiment considered, the blanking time $T_{BLANK}$ for the switch-on of the electronic switch SW is determined as a function of both, the output power $P_{OUT}$ and the input voltage Vin.

Generally, the various circuits may be implemented via analog circuits, or at least in part via a hardware and/or software digital processing. For example, the signals $V_S$ (or $T_2$) and $V_P$ may be provided to one or more analog-to digital converters, e.g., implemented in the circuits 2152 and 2144, and the signal BLANK (or alternatively the signal S_ON or directly the signal DRV) via a digital processing circuit, such as a microprocessor, implementing the same function.

Moreover, one or more of the parameters used to determine the signals $T_1$ and/or $T_2$ as a function of the output power $P_{OUT}$ and/or the input voltage Vin, respectively, and/or the conversion function of the circuit 2148 may be settable or programmable. For example, the resistor $R_{REF}$ shown in FIG. 12 may be a resistor connected to a terminal (pin/pad) of the integrated circuit of the control circuit 210a.

Of course, without prejudice to the principle of the disclosure, the details of construction and the embodiments may vary widely with respect to what has been described and illustrated herein purely by way of example, without thereby departing from the scope of the present disclosure.

A control circuit (210a) for an electronic converter (20), may be summarized as including two input terminals (200a, 200b) for receiving an input voltage (Vin), two output terminals (202a, 202b) for providing an output voltage (Vout) or output current (Iout) to a load (30), an inductance (L), and an electronic switch (SW) configured to selectively connect said inductance (T) to an input voltage (Vin); wherein said control circuit (210a) is configured to generate a drive signal (DRV) for said electronic switch (SW), wherein said control circuit (210a) is configured to generate switching cycles ($T_{SW}$) by: in response to a switch-on signal (S_ON), setting said drive signal (DRV) to a first logic level, thereby closing said electronic switch (SW) for a switch-on interval ($T_{ON}$); in response to a switch-off signal (S_ON), setting said drive signal (DRV) to a second logic level, thereby opening said electronic switch (SW) for a switch-off interval ($T_{OFF}$); wherein said control circuit (210a) includes a terminal configured to receive a first signal (CS) indicative of a current (Ipri) flowing through said inductance (T) during said switch-on interval ($T_{ON}$); a terminal configured to receive a second signal (ZCD) indicative of valleys in the voltage ($V_{SN}$) at said electronic switch (SW) during said switch-off interval ($T_{OFF}$); a terminal configured to receive a threshold signal (PTH); a terminal configured to receive a third signal ($V_P$) indicative of an output power ($P_{OUT}$) provided by said electronic converter (20) via said two output terminals (202a, 202b) to said load (30); a comparison circuit (2110) configured to generate said switch-off signal (S_OFF) by comparing said first signal (CS) with said threshold signal (PTH); a valley detection circuit (2100) configured to generate a trigger in a trigger signal ($T_{ZCD}$) when said second signal (ZCD) indicates a valley in the voltage ($V_{SN}$) at said electronic switch (SW) during said switch-off interval ($T_{OFF}$); a combinational logic circuit (2120) configured to generate said switch-on signal (S_ON) by masking said trigger signal ($T_{ZCD}$) in response to a blanking signal (BLANK); and a blanking circuit (2140) configured to generate said blanking signal (BLANK), wherein said blanking circuit (2140) is configured to determine (2144, 2148) a blanking time ($T_{BLANK}$) as a function of said third signal ($V_P$), and detect (2150) an instant corresponding to a start of said switch-on interval ($T_{ON}$) or a start of said switch-off interval ($T_{OFF}$) and assert said blanking signal (BLANK) when said blanking time ($T_{BLANK}$) elapses since said instant; wherein said control circuit (210a) includes further a terminal configured to receive a fourth signal ($V_S$) indicative of said input voltage (Vin); a blanking time adaption circuit (2142, 2146) configured to generate a blanking time adaption signal ($T_2$) as a function of said second measurement signal ($V_S$) indicative of said input voltage (Vin); adapt said blanking time ($T_{BLANK}$) as a function of said blanking time adaption signal ($T_2$), wherein said blanking time adaption circuit (2142, 2146) is configured to increase said blanking time ($T_{BLANK}$) when said fourth signal ($V_S$) indicates that said input voltage (Vin) increases, and decrease said blanking time ($T_{BLANK}$) when said fourth signal ($V_S$) indicates that said input voltage (Vin) decreases.

Said blanking circuit (2140) may be configured to determine (2144, 2148) said blanking time ($T_{BLANK}$) by detecting whether said third signal ($V_P$) indicates that said output power ($P_{OUT}$) may be greater than a first threshold ($P_1$) and smaller than a second threshold ($P_2$); and in response to determining that said output power ($P_{OUT}$) may be greater than a lower threshold ($P_1$) and smaller than an upper threshold ($P_2$), increasing said blanking time ($T_{BLANK}$) for a decreasing output power ($P_{OUT}$).

Said blanking circuit (2140) may be configured to determine (2144, 2148) said blanking time ($T_{BLANK}$) by in response to determining that said output power ($P_{OUT}$) may be smaller than said lower threshold ($P_1$), setting said blanking time ($T_{BLANK}$) to a first given value ($T_{B1}$); and/or in response to determining that said output power ($P_{OUT}$) may be greater than said upper threshold ($P_2$), setting said blanking time ($T_{BLANK}$) to a second given value ($T_{B2}$), wherein said second given value ($T_{B2}$) may be smaller than said first given value ($T_{B1}$).

Said control circuit (210a) may include a feedback circuit (212) configured to provide a feedback signal (FB) corresponding to said third signal ($V_P$), wherein said feedback circuit (212) may be configured to determine said feedback signal (FB) by measuring said output voltage (Vout) and said output current (Iout); generate said feedback signal (FB) via a regulator having an integral component configured to regulate said output voltage (Vout) to a reference value; or generate said feedback signal (FB) via a regulator having an integral component configured to regulate said output current (iout) to a reference value.

Said control circuit (210a) may include a measurement circuit (216) configured to provide said fourth signal ($V_S$), wherein said measurement circuit (216) may include a voltage divided ($R_{S1}$, $R_{S2}$).

Said inductance (L) may include a transformer (T) having an auxiliary winding (Taux), and said control circuit (210a) may include a measurement circuit (216, 2160) configured to generate said fourth signal ($V_S$) by measuring the voltage at said auxiliary winding (Taux).

Said measurement circuit (216) may include a sample-and-hold circuit (2152) configured to sample said fourth signal ($V_S$) and/or said blanking time adaption signal ($T_2$) either during said switch-on interval ($T_{ON}$) or during said switch-off interval ($T_{OFF}$).

Said blanking time adaption circuit (2142, 2146) may be configured to generate a blanking time adaption signal ($T_2$) via a monotonic increasing function of said input voltage (Vin), and adapt said blanking time ($T_{BLANK}$) by adding said blanking time adaption signal ($T_2$) to said blanking time ($T_{BLANK}$).

An integrated circuit may be summarized as including the control circuit (210a).

An electronic converter may be summarized as including two input terminals (200a, 200b) for receiving an input voltage (Vin), two output terminals (202a, 202b) for providing an output voltage (Vout) or output current (Iout) to a load (30), an inductance (L), an electronic switch (SW) configured to selectively connect said inductance (T) to said input voltage (Vin), and a control circuit (210a).

Said electronic converter may be a flyback converter.

A method of operating an electronic converter may be summarized as including in response to a switch-on signal (S_ON), setting said drive signal (DRV) to a first logic level, thereby closing said electronic switch (SW) for a switch-on interval ($T_{ON}$); in response to a switch-off signal (S_ON), setting said drive signal (DRV) to a second logic level, thereby opening said electronic switch (SW) for a switch-off interval ($T_{OFF}$); receiving a first signal (CS) indicative of a current (Ipri) flowing through said inductance (T) during said switch-on interval ($T_{ON}$); receiving a second signal (ZCD) indicative of valleys in the voltage ($V_{SN}$) at said electronic switch (SW) during said switch-off interval ($T_{OFF}$); receiving a third signal ($V_P$) indicative of an output power ($P_{OUT}$) provided by said electronic converter (20) via said two output terminals (202a, 202b) to said load (30); receiving a fourth signal ($V_S$) indicative of said input voltage (Vin); receiving a threshold signal (PTH); generating a trigger in a trigger signal ($T_{ZCD}$) when said second signal (ZCD) indicates a valley in the voltage ($V_{SN}$) at said electronic switch (SW) during said switch-off interval ($T_{OFF}$); determining (2144, 2148) a blanking time ($T_{BLANK}$) as a function of said third signal ($V_P$), detecting (2150) an instant corresponding to a start of said switch-on interval ($T_{ON}$) or a start of said switch-off interval ($T_{OFF}$) and assert said blanking signal (BLANK) when said blanking time ($T_{BLANK}$) elapses since said instant; generating a blanking time adaption signal ($T_2$) as a function of said second measurement signal ($V_S$) indicative of said input voltage (Vin); adapting said blanking time ($T_{BLANK}$) as a function of said blanking time adaption signal ($T_2$) by increasing said blanking time ($T_{BLANK}$) when said fourth signal ($V_S$) indicates that said input voltage (Vin) increases, and decreasing said blanking time ($T_{BLANK}$) when said fourth signal ($V_S$) indicates that said input voltage (Vin) decreases; generating said switch-on signal (S_ON) by masking said trigger signal ($T_{ZCD}$) during said blanking time ($T_{BLANK}$) via said blanking signal (BLANK); and generating said switch-off signal (S_OFF) by comparing said first signal (CS) with said threshold signal (PTH).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for an electronic converter, comprising:
    two input terminals configured to receive an input voltage;
    two output terminals configured to provide an output to a load;
    an inductance; and
    an electronic switch configured to selectively couple the inductance to the input voltage;
    wherein the control circuit is configured to generate a drive signal for the electronic switch, wherein the control circuit is configured to generate switching cycles by:
        in response to a switch-on signal, set the drive signal to a first logic level to close the electronic switch for a switch-on interval;
        in response to a switch-off signal, set the drive signal to a second logic level to open the electronic switch for a switch-off interval;
    wherein the control circuit includes:
        a terminal configured to receive a first signal indicative of a current flowing through the inductance during the switch-on interval;
        a terminal configured to receive a second signal indicative of valleys in a voltage at the electronic switch during the switch-off interval;
        a terminal configured to receive a threshold signal;
        a terminal configured to receive a third signal indicative of an output power provided by the electronic converter via the two output terminals to the load;
        a comparison circuit configured to generate the switch-off signal by comparing the first signal with the threshold signal; and
        a valley detection circuit configured to generate a trigger in a trigger signal when the second signal indicates a valley in the voltage at the electronic switch during the switch-off interval;
        a combinational logic circuit configured to generate the switch-on signal by masking the trigger signal in response to a blanking signal; and
        a blanking circuit configured to generate the blanking signal, wherein the blanking circuit is configured to:
            determine a blanking time as a function of the third signal, and
            detect an instant corresponding to a start of the switch-on interval or a start of the switch-off interval and assert the blanking signal when the blanking time elapses since the instant.

2. The control circuit according to claim 1, comprising: a terminal configured to receive a fourth signal indicative of the input voltage; and
    a blanking time adaption circuit configured to:
        generate a blanking time adaption signal as a function of a first measurement signal indicative of the input voltage; and
        adapt the blanking time as a function of the blanking time adaption signal, wherein the blanking time adaption circuit is configured to increase the blanking time when the fourth signal indicates that the input voltage increases, and decrease the blanking time when the fourth signal indicates that the input voltage decreases.

3. The control circuit according to claim 2, wherein the blanking circuit is configured to determine the blanking time by:
    detecting whether the third signal indicates that the output power is greater than a first threshold and smaller than a second threshold; and
    in response to determining that the output power is greater than a lower threshold and smaller than an upper threshold, increasing the blanking time for a decreasing output power.

4. The control circuit according to claim 3, wherein the blanking circuit is configured to determine the blanking time by:
    in response to determining that the output power is smaller than the lower threshold, setting the blanking time to a first given value.

5. The control circuit according to claim 3, wherein the blanking circuit is configured to determine the blanking time by:
    in response to determining that the output power is greater than the upper threshold, setting the blanking time to a second given value, wherein the second given value is smaller than the first given value.

6. The control circuit according to claim 5, wherein the control circuit comprises a feedback circuit configured to provide a feedback signal corresponding to the third signal, wherein the feedback circuit is configured to:
    determine the feedback signal by measuring the output; and
    generate the feedback signal via a regulator having an integral component configured to regulate the output to a reference value.

7. The control circuit according to claim 2, wherein the control circuit comprises a feedback circuit configured to provide a feedback signal corresponding to the third signal, wherein the feedback circuit is configured to:
    determine the feedback signal by measuring the output; and
    generate the feedback signal via a regulator having an integral component configured to regulate the output to a reference value.

8. The control circuit according to claim 2, wherein the control circuit comprises a measurement circuit configured to provide the fourth signal, wherein the measurement circuit comprises a voltage divided.

9. The control circuit according to claim 8, wherein the measurement circuit comprises a sample-and-hold circuit configured to sample at least one of the fourth signal and the blanking time adaption signal either during the switch-on interval or during the switch-off interval.

10. The control circuit according to claim 2, wherein the inductance comprises a transformer having an auxiliary winding, and wherein the control circuit comprises a measurement circuit configured to generate the fourth signal by measuring the voltage at the auxiliary winding.

11. The control circuit according to claim 10, wherein the measurement circuit comprises a sample-and-hold circuit configured to sample at least one of the fourth signal and the blanking time adaption signal either during the switch-on interval or during the switch-off interval.

12. The control circuit according to claim 2, wherein the blanking time adaption circuit is configured to:
generate a blanking time adaption signal via a monotonic increasing function of the input voltage, and
adapt the blanking time by adding the blanking time adaption signal to the blanking time.

13. An electronic converter, comprising:
input terminals configured to receive an input voltage;
output terminals configured to provide an output to a load;
an inductance;
an electronic switch configured to selectively couple the inductance to the input voltage; and
a control circuit configured to generate a drive signal for the electronic switch, the control circuit is configured to generate switching cycles by:
in response to a switch-on signal, set the drive signal to a first logic level to close the electronic switch for a switch-on interval;
in response to a switch-off signal, set the drive signal to a second logic level to open the electronic switch for a switch-off interval;
wherein the control circuit is configured to receive:
a first signal indicative of a current flowing through the inductance during the switch-on interval;
a second signal indicative of valleys in the voltage at the electronic switch during the switch-off interval;
a threshold signal;
a third signal indicative of an output power provided by the electronic converter via the two output terminals to the load;
wherein the control circuit includes:
a comparison circuit configured to generate the switch-off signal by comparing the first signal with the threshold signal;
a valley detection circuit configured to generate a trigger in a trigger signal when the second signal indicates a valley in the voltage at the electronic switch during the switch-off interval;
a combinational logic circuit configured to generate the switch-on signal by masking the trigger signal in response to a blanking signal; and
a blanking circuit configured to generate the blanking signal, wherein the blanking circuit is configured to:
determine a blanking time as a function of the third signal, and
detect an instant corresponding to a start of the switch-on interval or a start of the switch-off interval and assert the blanking signal when the blanking time elapses since the instant.

14. The electronic converter according to claim 13, wherein the control circuit further includes:
a terminal configured to receive a fourth signal indicative of the input voltage; and
a blanking time adaption circuit configured to:
generate a blanking time adaption signal as a function of a first measurement signal indicative of the input voltage; and
adapt the blanking time as a function of the blanking time adaption signal, wherein the blanking time adaption circuit is configured to increase the blanking time when the fourth signal indicates that the input voltage increases, and decrease the blanking time when the fourth signal indicates that the input voltage decreases.

15. The electronic converter according to claim 13, wherein the electronic converter is a flyback converter.

16. The electronic converter according to claim 13, wherein the control circuit is further configured to:
detect whether the third signal indicates that the output power is greater than a first threshold and smaller than a second threshold; and
in response to determining that the output power is greater than a lower threshold and smaller than an upper threshold, increase the blanking time for a decreasing output power.

17. A method of operating an electronic converter, comprising:
in response to a switch-on signal, setting a drive signal to a first logic level, thereby closing an electronic switch for a switch-on interval;
in response to a switch-off signal, setting the drive signal to a second logic level, thereby opening the electronic switch for a switch-off interval;
receiving a first signal indicative of a current flowing through an inductance during the switch-on interval;
receiving a second signal indicative of valleys in a voltage at the electronic switch during the switch-off interval;
receiving a third signal indicative of an output power provided by an electronic converter via two output terminals to a load;
receiving a fourth signal indicative of an input voltage;
receiving a threshold signal;
generating a trigger in a trigger signal when said second signal indicates a valley in the voltage at said electronic switch during said switch-off interval;
determining a blanking time as a function of a third signal;
detecting an instant corresponding to a start of the switch-on interval or a start of the switch-off interval and assert a blanking signal when the blanking time elapses since the instant;
generating a blanking time adaption signal as a function of a first measurement signal indicative of the input voltage;
adapting the blanking time as a function of the blanking time adaption signal by increasing the blanking time when the fourth signal indicates that the input voltage increases, and decreasing the blanking time when the fourth signal indicates that the input voltage decreases;
generating the switch-on signal by masking the trigger signal during the blanking time via the blanking signal; and
generating the switch-off signal by comparing the first signal with the threshold signal.

18. The method according to claim 17, wherein determining a blanking time as a function of a third signal further comprises:
detecting whether the third signal indicates that the output power is greater than the second threshold; and
in response to detecting that the output power is greater than the second threshold, setting the blanking time to a constant time.

* * * * *